United States Patent
Atkins et al.

(10) Patent No.: US 11,979,589 B2
(45) Date of Patent: *May 7, 2024

(54) FRAME-RATE SCALABLE VIDEO CODING

(71) Applicant: Dolby Laboratories Licensing Corporation, San Francisco, CA (US)

(72) Inventors: Robin Atkins, Vancouver (CA); Peng Yin, Ithaca, NY (US); Taoran Lu, Santa Clara, CA (US); Fangjun Pu, Sunnyvale, CA (US); Sean Thomas McCarthy, San Francisco, CA (US); Walter J. Husak, Simi Valley, CA (US); Tao Chen, Palo Alto, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,088

(22) Filed: Nov. 13, 2023

(65) Prior Publication Data

US 2024/0080465 A1 Mar. 7, 2024

Related U.S. Application Data

(63) Continuation of application No. 18/477,511, filed on Sep. 28, 2023, which is a continuation of application
(Continued)

(51) Int. Cl.
*H04N 19/31* (2014.01)
*H04N 19/172* (2014.01)
(Continued)

(52) U.S. Cl.
CPC .......... *H04N 19/31* (2014.11); *H04N 19/172* (2014.11); *H04N 19/187* (2014.11); *H04N 19/30* (2014.11); *H04N 19/46* (2014.11); *H04N 19/70* (2014.11)

(58) Field of Classification Search
None
See application file for complete search history.

(56) References Cited

U.S. PATENT DOCUMENTS 9,554,132 B2 1/2017 Crenshaw
10,063,886 B2 8/2018 Ye
(Continued)

FOREIGN PATENT DOCUMENTS

CN 105744251 A 7/2016
CN 110063055 A 7/2019
(Continued)

OTHER PUBLICATIONS

Brendel, H. et al. "What is more Compelling: More Pixels or Higher Frame Rate?" SMPTE 2012.
(Continued)

*Primary Examiner* — Stuart D Bennett

(57) ABSTRACT

Methods and systems for frame rate scalability are described. Support is provided for input and output video sequences with variable frame rate and variable shutter angle across scenes, or for input video sequences with fixed input frame rate and input shutter angle, but allowing a decoder to generate a video output at a different output frame rate and shutter angle than the corresponding input values. Techniques allowing a decoder to decode more computationally-efficiently a specific backward compatible target frame rate and shutter angle among those allowed are also presented.

11 Claims, 3 Drawing Sheets

Related U.S. Application Data

No. 18/096,425, filed on Jan. 12, 2023, now Pat. No. 11,818,372, which is a continuation of application No. 17/666,887, filed on Feb. 8, 2022, now Pat. No. 11,582,472, which is a continuation of application No. 17/212,701, filed on Mar. 25, 2021, now Pat. No. 11,323,728, which is a continuation-in-part of application No. 16/901,911, filed on Jun. 15, 2020, now Pat. No. 10,999,585, which is a continuation of application No. PCT/US2020/022018, filed on Mar. 11, 2020.

(60) Provisional application No. 62/904,744, filed on Sep. 24, 2019, provisional application No. 62/883,195, filed on Aug. 6, 2019, provisional application No. 62/850,985, filed on May 21, 2019, provisional application No. 62/816,521, filed on Mar. 11, 2019.

(51) Int. Cl.
   *H04N 19/187*   (2014.01)
   *H04N 19/30*    (2014.01)
   *H04N 19/46*    (2014.01)
   *H04N 19/70*    (2014.01)

(56) References Cited

U.S. PATENT DOCUMENTS

| | | | |
|---|---|---|---|
| 10,110,890 B2 | 10/2018 | Haque | |
| 10,116,952 B2 | 10/2018 | Lin | |
| 10,148,983 B2 | 12/2018 | Hendry | |
| 10,499,009 B1 | 12/2019 | Zhang | |
| 10,999,585 B2 | 5/2021 | Atkins | |
| 2007/0120997 A1 | 5/2007 | Sasaki | |
| 2009/0201383 A1 | 8/2009 | Slavin | |
| 2013/0034170 A1 | 2/2013 | Chen | |
| 2013/0182756 A1 | 7/2013 | Furlan | |
| 2014/0192901 A1 | 7/2014 | Wang | |
| 2014/0355692 A1 | 12/2014 | Ramasubramonian | |
| 2015/0109488 A1 | 4/2015 | Mobbs | |
| 2015/0201198 A1 | 7/2015 | Marlatt | |
| 2016/0073118 A1 | 3/2016 | Iguchi | |
| 2016/0073119 A1 | 3/2016 | Toma | |
| 2016/0165276 A1 | 6/2016 | Toma | |
| 2016/0191932 A1 | 6/2016 | Toma | |
| 2016/0234500 A1* | 8/2016 | Tsukagoshi | H04N 19/132 |
| 2016/0295257 A1 | 10/2016 | Iguchi | |
| 2017/0105015 A1 | 4/2017 | Haque | |
| 2017/0105019 A1 | 4/2017 | Redmann | |
| 2017/0127070 A1 | 5/2017 | Suzuki | |
| 2017/0264861 A1 | 9/2017 | Xu | |
| 2017/0359611 A1 | 12/2017 | Iguchi | |
| 2018/0063542 A1 | 3/2018 | Haque | |
| 2018/0146235 A1 | 5/2018 | Tsukagoshi | |
| 2018/0166102 A1 | 6/2018 | Newman | |
| 2018/0255272 A1 | 9/2018 | Tsukagoshi | |
| 2019/0045116 A1 | 2/2019 | Yamamoto | |
| 2020/0213657 A1 | 7/2020 | Tsukagoshi | |
| 2021/0136421 A1 | 5/2021 | Fairhurst | |

FOREIGN PATENT DOCUMENTS

| | | |
|---|---|---|
| JP | 2016005244 A | 1/2016 |
| JP | 2016506691 A | 3/2016 |
| JP | 2016226035 A | 12/2016 |
| JP | 2017005723 A | 1/2017 |
| RU | 2665891 C2 | 9/2018 |
| WO | 2015076277 A1 | 5/2015 |
| WO | 2015115946 A1 | 8/2015 |
| WO | 2016185947 A1 | 11/2016 |
| WO | 2018110583 A1 | 6/2018 |
| WO | 2018123542 A1 | 7/2018 |
| WO | 2019067762 A1 | 4/2019 |
| WO | 2020185853 A2 | 9/2020 |

OTHER PUBLICATIONS

Bross, B. et al. Versatile Video Coding (Draft 4) JVET output document, JVET-M1001, v5, uploaded, Feb. 27, 2019.

Carbonara, C. et al."High Frame Rate Capture and Production" SMPTE Meeting Presentation 2015 Society of Motion Picture & Television Engineers.

Gary Sullivan, Meeting report of the 36th meeting of the Joint Collaborative Team on Video Coding (JCT-VC).

Infrastructure of audiovisual services—Transmission multiplexing and synchronization, H.222.0, Series H, Generic coding of moving pictures and associated audio information: Systems, ITU, Aug. 2018.

ITU H.265 "High Efficiency Video Coding" Series of moving Video, ITU Feb. 2018.

Mackin, A. et al."A Frame Rate Conversion Method Based on a Virtual Shutter Angle" IEEE International Conference on Image Processing, Sep. 22, 2019, pp. 4215-4219.

McCarthy, S. et al."AHG7: Indication of Shutter Angle for Variable Frame Rate Application" JCT-VC Meeting, Jul. 2019. JCT on Video Coding of ISO/IEC JTC1/SC29WG11 and ITU-TSG.16.

Mitchell, Nick "Digital Cinema Mastering" Considerations for Higher Frame Rates SMPTE 2012.

Omori, Y. et al."A 120 fps High Frame Rate Real-Time HEVC Video Encoder with Parallel Configuration Scalable to 4K" IEEE Transactions on Multi-Scale Computing Systems, vol. 4, No. 4, Oct.-Dec. 2018, pp. 491-499.

Sean McCarthy, et al., AHG7: Shutter interval information SEI message , Joint Collaborative Team on Video Coding (JCT-VC) of ITU-T SG 16 WP3 and ISO/IEC JTC 1/SC 29/WG 11 , JCTVC-AK0026-v2 , 37th Meeting: Geneva, CH , Oct. 2019 , pp. 1-7.

Sean McCarthy, et al. , Illustration of the shutter interval info SEI message in HEVC Draft , Joint Collaborative Team on Video Coding (JCT-VC) of ITU-T SG 16 WP 3 and ISO/IEC JTC 1/SC 29/WG 11 , JCTVC-AM0024-v1 , 39th Meeting: by teleconference , Apr. 2020 , pp. 1-4.

Sean McCarthy, et al. , Shutter interval info SEI message in AVC , Joint Collaborative Team on Video Coding (JCT-VC) of ITU-T SG 16 WP 3 and ISO/IEC JTC 1/SC 29/WG 11 , JCTVC-AN0023 , 40th Meeting: by teleconference , Jun. 2020 , pp. 1-4.

Sean T. McCarthy, Gary J. Sullivan, and Ye-Kui Wang, Shutter interval information SEI message for HEVC (Draft 2), Joint Collaborative Team on Video Coding (JCT-VC) of ITU-T SG 16 WP 3 and ISO/IEC JTC 1/SC 29/WG 11, JCTVC-AL1005-v1, 38th Meeting: Brussels, BE, Feb. 2020, pp. 1-7.

Segall, A. et al."On Frame Rate Support and Extraction in VVC" JVET Meeting, Marrakech, the Joint Video Exploration Team of ISO/IEC JTC1/SC29/WG11, Jan. 2019.

Sullivan G. et al. "Meeting report of the 36th meeting of the Joint Collaborative Team on Video Coding." In: Joint Collaborative Team on Video Coding (JCT-VC) of ITU-T SG16 WP3 and ISO/IEC JTC1/SC29/WG11; 37th Meeting: Geneva, CH, Oct. 4-11, 2019.

Ugur, K. et al."Exif Data SEI Message", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0038.

McCarthy (Dolby) Set Al: "AHG8/AHG17: indication of shutter angle for variable frame rate application", 15. JVET Meeting; Jul. 3, 2019-Jul. 12, 2019; Gothenburg; (The Joint Video Exploration Team of ISO/IEC JTC1/SC29/WG11 and ITU-TSG.16 ), Jun. 25, 2019, JVET-O0436, m48556.

* cited by examiner

FRAME-RATE SCALABLE VIDEO CODING

CROSS-REFERENCE TO RELATED APPLICATIONS

The present application is a continuation of U.S. patent application Ser. No. 18/477,511, filed on Sep. 28, 2023, which is a continuation of U.S. patent application Ser. No. 18/096,425, filed on Jan. 12, 2023, which is a continuation of U.S. patent application Ser. No. 17/666,887, filed on Feb. 8, 2022, now U.S. Pat. No. 11,582,472 (issued Feb. 14, 2023), which is a continuation of U.S. patent application Ser. No. 17/212,701, filed on Mar. 25, 2021, now U.S. Pat. No. 11,323,728 (issued May 3, 2022), which is a continuation of U.S. patent application Ser. No. 16/901,911, filed on Jun. 15, 2020, now U.S. Pat. No. 10,999,585 (issued May 4, 2021), which is a continuation-in-part (CIP) Patent Application of PCT Application Ser. No. PCT/US2020/022018, filed on Mar. 11, 2020, which claims the benefit of priority from U.S. Provisional Application No. 62/816,521, filed on Mar. 11, 2019, U.S. Provisional Application No. 62/850,985, filed on May 21, 2019, U.S. Provisional Application No. 62/883,195, filed on Aug. 6, 2019, and U.S. Provisional Application No. 62/904,744, filed Sep. 24, 2019, each of which is incorporated by reference in its entirety.

TECHNOLOGY

The present document relates generally to images. More particularly, an embodiment of the present invention relates to frame-rate scalable video coding.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range (SDR), while images where n>8 may be considered images of enhanced dynamic range. HDR images may also be stored and distributed using high-precision (e.g., 16-bit) floating-point formats, such as the OpenEXR file format developed by Industrial Light and Magic.

Currently, distribution of video high dynamic range content, such as Dolby Vision from Dolby laboratories or HDR10 in Blue-Ray, is limited to 4K resolution (e.g., 4096×2160 or 3840×2160, and the like) and 60 frames per second (fps) by the capabilities of many playback devices. In future versions, it is anticipated that content of up to 8K resolution (e.g., 7680×4320) and 120 fps may be available for distribution and playback. It is desirable that future content types will be compatible with existing playback devices in order to simplify an HDR playback content ecosystem, such as Dolby Vision. Ideally, content producers should be able to adopt and distribute future HDR technologies without having to also derive and distribute special versions of the content that are compatible with existing HDR devices (such as HDR10 or Dolby Vision). As appreciated by the inventors here, improved techniques for the scalable distribution of video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
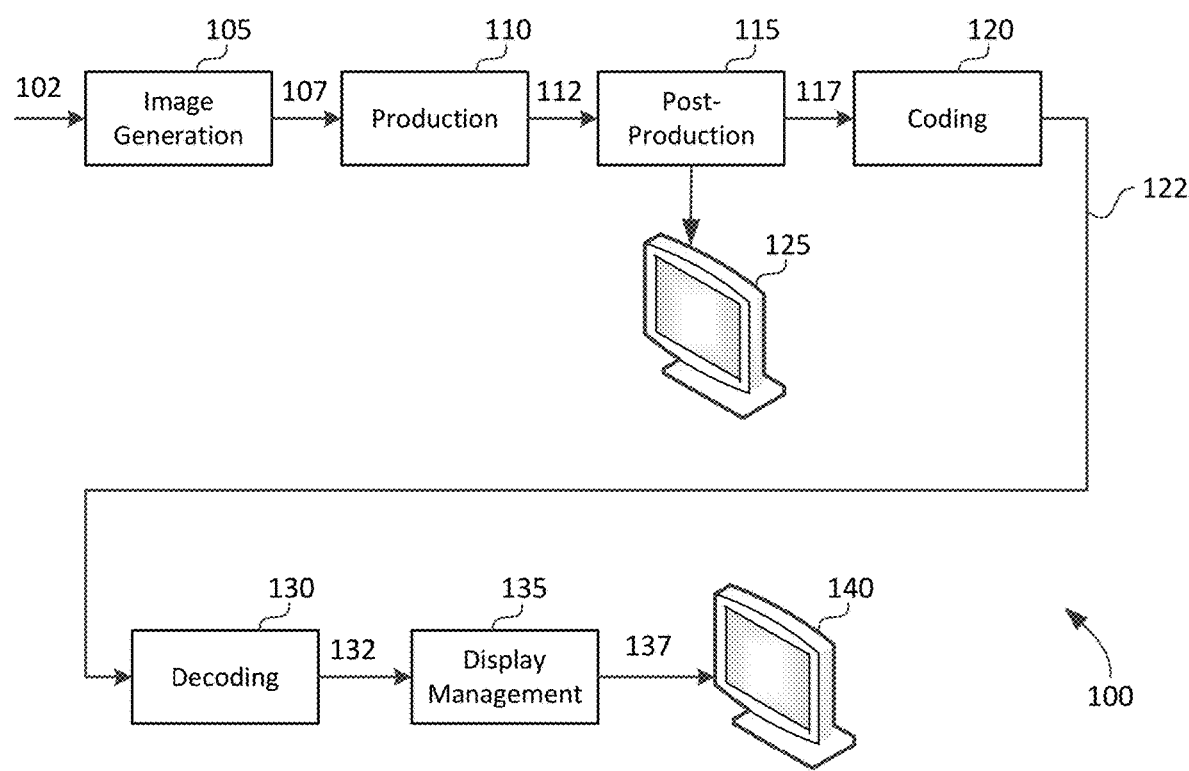
FIG. 1 depicts an example process for a video delivery pipeline.

Example embodiments that relate to frame-rate scalability for video coding are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to frame rate scalability in video coding. In an embodiment, a system with a processor receives a coded bitstream comprising coded video frames, wherein one or more coded frames are encoded in a first frame rate and a first shutter angle. The processor receives a first flag indicating the presence of a group of coded frames to be decoded at a second frame rate and a second shutter angle, it accesses from the coded bitstream values of the second frame rate and the second shutter angle for the group of coded frames, and generates decoded frames at the second frame rate and the second shutter angle based on the group of coded frames, the first frame rate, the first shutter angle, the second frame rate and the second shutter angle.

In a second embodiment, a decoder with a processor:
receives a coded bitstream comprising groups of coded video frames, wherein all coded video frames in the coded bitstream are encoded in a first frame rate;
receives a number of combined frames N;
receives a value for a baseline frame rate;
accesses a group of N consecutive coded frames, wherein the i-th coded frame in the group of N consecutive coded frames, wherein i=1, 2, . . . N, represents an average of up to i input video frames encoded in an encoder at the baseline frame rate and an i-th shutter angle based on a first shutter angle and the first frame rate;
accesses from the coded bitstream or from user input values for a second frame rate and a second shutter angle, for decoding the group of N consecutive coded frames in the second frame rate and the second shutter angle; and
generates decoded frames at the second frame rate and the second shutter angle based on the group of N consecutive coded frames, the first frame rate, the first shutter angle, the second frame rate, and the second shutter angle.

In a third embodiment, an encoded video stream structure comprises:
an encoded picture section including an encoding of a sequence of video pictures; and
a signaling section including an encoding of:
a shutter interval time-scale parameter indicating the number of time units passing in one second;
a shutter interval clock-ticks parameter indicating a number of time units of a clock operating at the frequency of the shutter interval time-scale parameter,
wherein the shutter interval clock-ticks parameter divided by the shutter interval time-scale parameter indicates an exposure duration value;
a shutter-interval-duration flag indicating whether exposure duration information is fixed for all temporal sub-layers in the encoded picture section; and
if the shutter-interval-duration flag indicates that the exposure duration information is fixed, then a decoded version of the sequence of video pictures for all the temporal sub-layers in the encoded picture section is decoded by computing the exposure duration value based on the shutter interval time-scale parameter and the shutter interval clock-ticks parameter, else
the signaling section includes one or more arrays of sub-layer parameters, wherein values in the one or more arrays of sub-layer parameters combined with the shutter interval time-scale parameter are used to compute for each sub-layer a corresponding sub-layer exposure duration value for displaying a decoded version of the temporal sub-layer of the sequence of video pictures.

Example Video Delivery Processing Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, judder or blur control, frame rate control, etc.) may be performed at block (115) to yield a final version (117) of the production for distribution. During post-production editing (115), video images are viewed on a reference display (125). Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Scalable Coding

Scalable coding is already part of a number of video coding standards, such as, MPEG-2, AVC, and HEVC. In embodiments of this invention, scalable coding is extended to improve performance and flexibility, especially as it relates to very high resolution HDR content.

As used herein, the term "shutter angle" denotes an adjustable shutter setting which controls the proportion of time that film is exposed to light during each frame interval. For example, in an embodiment $$\frac{\text{shutter angle}}{360} = \frac{\text{exposure time}}{\text{frame interval}}. \tag{1}$$

The term comes from legacy, mechanical, rotary shutters; however, modern digital cameras can also adjust their shutter electronically. Cinematographers may use the shutter angle to control the amount of motion blur or judder that is recorded in each frame. Note that instead of using "exposure time" one may also use alternative terms, like "exposure duration," "shutter interval," and "shutter speed." Similarly, instead of using "frame interval" one may use the term "frame duration." Alternatively, one may replace "frame interval" with "1/frame rate." The value of exposure time is typically less than or equal to the duration of a frame. For example, a shutter angle of 180 degrees indicates that the exposure time is half of the frame duration. In some situations, exposure time may be greater than the frame duration of coded video, for example, when the encoded frame rate is 120 fps and the frame rate of the associated video content prior to encoding and display is 60 fps.

Consider, without limitation, an embodiment where original content is shot (or generated) at an original frame rate (e.g., 120 fps) with a shutter angle of 360 degrees. Then, in a receiving device, one can render video output at a variety of frame rates equal to or lower than the original frame rate by judicial combination of the original frames, e.g., by averaging or other known in the art operations.

The combining process may be performed with non-linear encoded signals, (e.g., using gamma, PQ or HLG), but best image quality is obtained by combining frames in the linear light domain by first, converting the non-linear encoded signals into linear-light representations, next, combining the converted frames, and finally re-encoding the output with the non-linear transfer function. This process provides a more accurate simulation of a physical camera exposure than combining in the non-linear domain.

In general terms, the process of combining frames can be express in terms of the original frame rate, the target frame rate, the target shutter angle, and the number of frames to be combined as:

$$n\_frames=(target\_shutter\_angle/360)*(original\_frame\_rate/target\_frame\_rate), \quad (2)$$

which is equivalent to $$target\_shutter\_angle=360*n\_frames*(target\_frame\_rate/original\_frame\_rate), \quad (3)$$

where n_frames is the number of combined frames, original_frame_rate is the frame rate of the original content, target_frame_rate is the frame rate to be rendered (where, target_frame_rate≤original_frame_rate), and target_shutter_angle indicates the amount of desired motion blur. In this example, the maximum value of target_shutter_angle is 360 degrees and corresponds to the maximal motion blur. The minimum value of target_shutter_angle can be expressed as 360*(target_frame_rate/original_frame_rate) and corresponds to minimal motion blur. The maximum value of n_frames can be expressed as (original_frame_rate/target_frame_rate). The values of target_frame_rate and target_shutter_angle should be selected such that the value of n_frames is a non-zero integer.

In the special case that the original frame rate is 120 fps, equation (2) can be rewritten as $$n\_frames=target\_shutter\_angle/(3*target\_frame\_rate), \quad (4)$$

which is equivalent to $$target\_shutter\_angle=3*n\_frames*target\_frame\_rate. \quad (5)$$

The relationships between the values of target_frame_rate, n_frames, and target_shutter_angle are shown in Table 1 for the case of original_frame_rate=120 fps. In Table 1, "NA" indicates that the corresponding combination of a target frame rate and the number of combined frames is not allowed.

TABLE 1

Relationship among target frame rate, number of frames combined, and target shutter angle, for an original frame rate of 120 fps.

| Target Frame Rate (fps) | Number of Frames Combined | | | | |
|---|---|---|---|---|---|
| | 5 | 4 | 3 | 2 | 1 |
| | Target Shutter Angle (degrees) | | | | |
| 24 | 360 | 288 | 216 | 144 | 72 |
| 30 | NA | 360 | 270 | 180 | 90 |
| 40 | NA | NA | 360 | 240 | 120 |
| 60 | NA | NA | NA | 360 | 180 |

Figure 2:
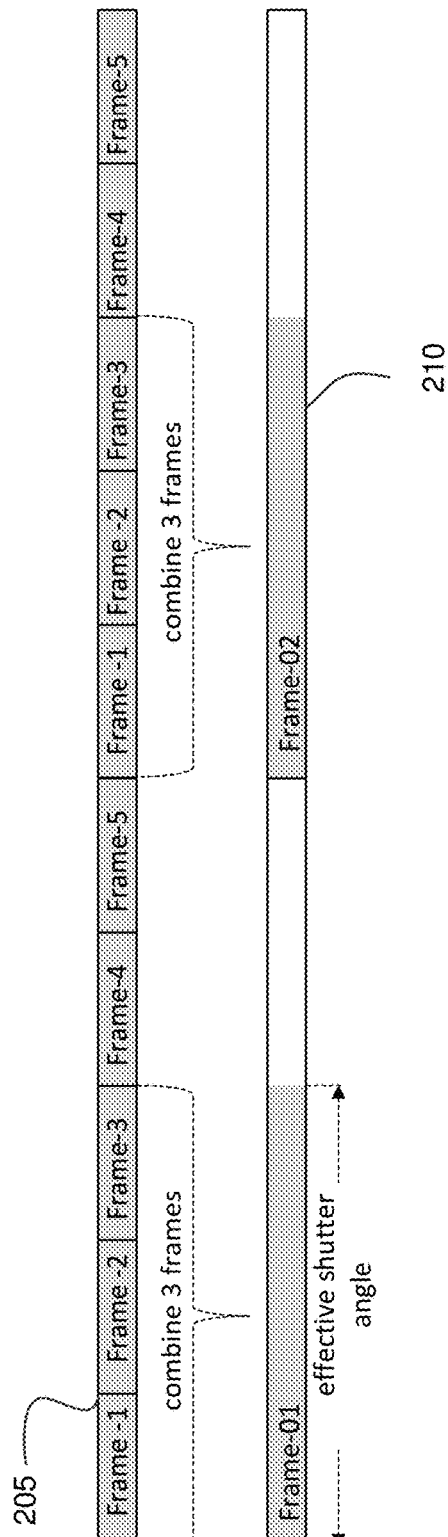
FIG. 2 depicts an example process of combining consecutive original frames to render a target frame rate at a target shutter angle according to an embodiment of this invention.

FIG. 2 depicts an example process of combining consecutive original frames to render a target frame rate at a target shutter angle according to an embodiment. Given an input sequence (205) at 120 fps and a shutter angle of 360 degrees, the process generates an output video sequence (210) at 24 fps and a shutter angle of 216 degrees by combining three of the input frames in a set of five consecutive frames (e.g., the first three consecutive frames), and dropping the other two. Note that in some embodiments, output frame-01 of (210) may be generated by combining alternative input frames (205), such as frames 1, 3, and 5, or frames 2, 4, and 5, and the like; however, it is expected that combining consecutive frames will yield video output of better quality.

It is desirable to support original content with variable frame rate, for example, to manage artistic and stylistic effect. It is also desirable that the variable input frame rate of the original content is packaged in a "container" that has a fixed frame rate to simplify content production, exchange, and distribution. As an example, three embodiments on how to represent the variable frame rate video data in a fixed frame rate container are presented. For purposes of clarity and without limitation, the following descriptions use fixed 120 fps container, but the approaches can easily be extended to an alternative frame rate container.

First Embodiment (Variable Frame Rate)

The first embodiment is an explicit description of original content having variable (non-constant) frame rate packaged in a container having constant frame rate. For example, original content that has different frames rate, say, at 24, 30, 40, 60, or 120 fps, for different scenes, may be packaged in a container having a constant frame rate of 120 fps. For this example, each input frame can be duplicated either 5×, 4×, 3×, 2×, or 1× times to package it into a common 120 fps container.

Figure 3:
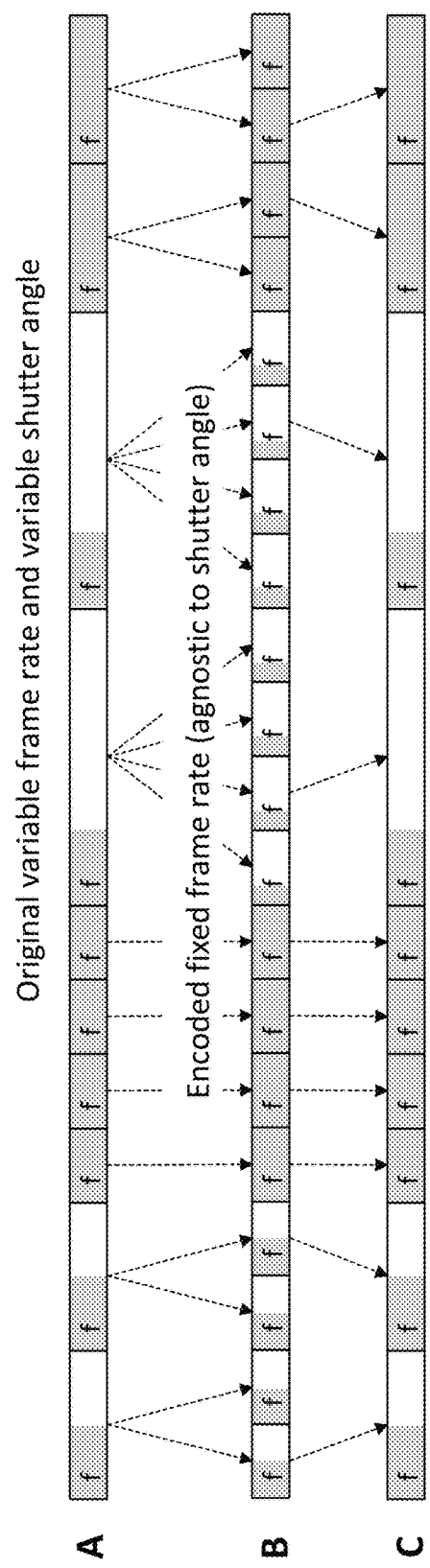
FIG. 3 depicts an example representation of an input sequence with variable input frame rate and variable shuttle angle in a container with a fixed frame rate according to an embodiment of this invention.

FIG. 3 depicts an example of an input video sequence A with variable frame rate and variable shutter angle which is represented in a coded bitstream B with a fixed frame rate. Then, in a decoder, the decoder reconstructs output video sequence C at the desired frame rate and shutter angle, which may change from scene to scene. For example, as depicted in FIG. 3, to construct sequence B, some of the input frames are duplicated, some are coded as is (with no duplication), and some are copied four times. Then, to construct sequence C, any one frame from each set of duplicate frames is selected to generate output frames, matching the original frame rate and shutter angle.

In this embodiment, metadata is inserted in the bitstream to indicate the original (base) frame rate and shutter angle. The metadata may be signaled using high level syntax such as a Sequence Parameter Set (SPS), a Picture Parameter Set (PPS), a Slice or Tile Group header, and the like. The presence of metadata enables encoders and decoders to perform beneficial functions, such as:

a) An encoder can ignore duplicated frames, thereby increasing encoding speed and simplifying processing. For example, all coding tree units (CTUs) in duplicated frames can be encoded using SKIP mode and reference index 0 in LIST 0 of the reference frames, which refers to a decoded frame from which duplicated frames are copied.

b) A decoder can bypass decoding of duplicate frames thereby simplifying processing. For example, metadata in the bitstream can indicate that a frame is a duplicate of a previously decoded frame that the decoder can reproduce by copying and without decoding the new frame.

c) A playback device can optimize downstream processing by indicating the base frame rate, for example by adjusting frame rate conversion or noise reduction algorithms.

This embodiment enables an end user to view rendered content at the frame rates intended by the content creators. This embodiment does not provide for backwards compatibility with devices that do not support the frame rate of the container, e.g., 120 fps.

Tables 2 and 3 depict example syntax of raw byte sequence payload (RBSB) for a sequence parameter set and Tile Group header, where the proposed new syntax elements are depicted in an italic font. The remaining syntax follows the syntax in the proposed specification of the Versatile Video Codec (VVC) (Ref.[2]).

As an example, in SPS (see Table 2), one may add a flag to enable variable frame rate.

sps_vfr_enabled_flag equal to 1 specifies that the coded video sequence (CVS) may contain variable frame rate content. sps_vfr_enabled_flag equal to 0 specifies that the CVS contains fixed frame rate content.

In the tile_group header( ) (see Table 3), tile_group_vrf_info_present_flag equal to 1 specifies the syntax elements tile_group_true_fr and tile_group_shutterangle are present in the syntax. tile_group_vrf_info_present_flag equal to 0 specifies the syntax elements tile_group_true_fr and tile_group_shutterangle are not present in the syntax. When tile_oup_vrf_info_present_flag is not present, it is inferred to be 0.

tile_group_true_fr indicates the true frame rate of the video data carried in this bitstream. tile_group_shutterangle indicates the shutter angle corresponding to the true frame rate of the video data carried in this bitstream.

tile_group_skip_flag equal to 1 specifies that the current tile group is copied from another tile group. tile_group_skip_flag equal to 0 specifies that the current tile group is not copied from another tile group.

tile_group_copy_pic_order_cnt_lsb specifies the picture order count modulo MaxPicOrderCntLsb for the previously decoded picture which the current picture copies from when tile_group_skip_flag is set to 1.

TABLE 2

Example parameter set RBSP syntax for content with variable frame-rate

| seq_parameter_set_rbsp( ) { | Descriptor |
|---|---|
| sps_max_sub_layers_minus1 | u(3) |
| sps_reserved_zero_5bits | u(5) |
| profile_tier_level( sps_max_sub_layers_minus1 ) | |
| sps_seq_parameter_set_id | ue(v) |
| ... | |

TABLE 2-continued

Example parameter set RBSP syntax for content with variable frame-rate

| seq_parameter_set_rbsp( ) { | Descriptor |
|---|---|
| sps_vfr_enabled_flag | u (1) |
| ... | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

TABLE 3

Example of Tile Group header syntax with support for content with variable frame rate

| tile_group_header( ) { | Descriptor |
|---|---|
| tile_group_pic_parameter_set_id | ue(v) |
| if( NumTilesInPic > 1 ) { | |
| tile_group_address | u(v) |
| num_tiles_in_tile_group_minus1 | ue(v) |
| } | |
| tile_group_type | ue(v) |
| tile_group_pic_order_cnt_lsb | u(v) |
| if( sps_vfr_enabled_flag ) { | |
| tile_group_vfr_info_present_flag | u(1) |
| if (tile_group_vfr_info_present_flag) { | |
| tile_group_true_fr | u(9) |
| tile_group_shutterangle | u(9) |
| } | |
| tile_group_skip_flag | u(1) |
| } | |
| if( tile_group_skip_flag ) | |
| tile_group_copy_pic_order_cnt_lsb | u(v) |
| else { | |
| ALL OTHER TILE_GROUP_SYNTAX | |
| } | |
| if( num_tiles_in_tile_group_minus1 > 0 ) { | |
| offset_len_minus1 | ue(v) |
| for( i = 0; i < num_tiles_in_tile_group_minus1; i++ ) | |
| entry_point_offset_minus1[ i ] | u(v) |
| } | |
| byte_alignment( ) | |
| } | |

Second Embodiment—Fixed Frame Rate Container

The second embodiment enables the use case in which original content having a fixed frame rate and shutter angle may be rendered by a decoder at an alternative frame rate and variable simulated shutter angle, such as illustrated in FIG. 2. For example, in the case that original content has a frame rate of 120 fps and a shutter angle of 360 degrees (meaning the shutter is open 1/120 second), a decoder can render out multiple frame rates that are less than or equal to 120 fps. For example, as described in Table 1, to decode 24 fps with a 216-degrees simulated shutter angle, the decoder may combine three decoded frames and display at 24 fps. Table 4 expands upon Table 1 and illustrates how to combine different numbers of encoded frames to render at the output target frame rates and the desired target shutter angles. Combining the frames may be performed by simple pixel averaging, by weighted pixel averaging, where pixels from a certain frame may be weighted more than pixels of other frames and the sum of all weights sums to one, or by other filter interpolation schemes known in the art. In Table 4, the function Ce(a,b) denotes the combination of encoded frames a to b, where the combining can be performed by averaging, weighted averaging, filtering, and the like.

TABLE 4

Example of combining input frames at 120 fps to generate output frames at target fps and shutter angle values

| Input | s1 | s2 | s3 | s4 | s5 | s6 | s7 | s8 | s9 | s10 |
|---|---|---|---|---|---|---|---|---|---|---|
| Enc. | e1 | e2 | e3 | e4 | e5 | e6 | e7 | e8 | e9 | e10 |
| Dec. 120 fps | | | | | | | | | | |
| @360 Dec. 60 fps | e1 | e2 | e3 | e4 | e5 | e6 | e7 | e8 | e9 | e10 |
| @360 @180 Dec. 40 fps | Ce(1, 2) e1 | | Ce(3, 4) e3 | | Ce(5, 6) e5 | | Ce(7, 8) e7 | | Ce(9, 10) e9 | |
| @360 @240 @120 Dec. 30 fps | Ce(1, 3) Ce(1, 2) e1 | | | Ce(4, 6) Ce(4, 5) e4 | | | Ce(7, 9) Ce(7, 8) e7 | | | Ce(10, 12) Ce(10, 11) e10 |
| @360 @270 @180 @90 Dec. 24 fps | Ce(1, 4) C(1, 3) Ce(1, 2) e1 | | | | Ce(5, 8) Ce(5, 7) Ce(5, 6) e5 | | | | Ce(9, 12) Ce(9, 11) Ce(9, 10) e9 | |
| @360 @288 @216 @144 @72 | Ce(1, 5) Ce(1, 4) Ce(1, 3) Ce(1, 2) e1 | | | | | Ce(6, 10) Ce(6, 9) Ce(6, 8) Ce(6, 7) e6 | | | | |

When the value of the target shutter angle is less than 360 degrees, the decoder can combine different sets of decoded frames. For example, from Table 1, given an original stream of 120 fps @ 360-degrees, to generate a stream at 40 fps and a 240-degrees shutter angle, a decoder needs to combine two frames out of three possible frames. Thus, it may combine either the first and the second frames or the second and the third frames. The choice of which frames to combine may be described in terms of a "decoding phase" expressed as:

$$\text{decode\_phase} = \text{decode\_phase\_idx} * (360/n\_\text{frames}), \quad (6)$$

where decode_phase_idx indicates the offset index within a set of sequential frames having index values in [0, n_frames_max−1], where n_frames is given by equation (2), and $$n\_\text{frames\_max} = \text{orig\_frame\_rate}/\text{target\_frame\_rate}. \quad (7)$$

In general, decode_phase_idx ranges from [0, n_frames_max−n_frames]. For example, for an original sequence at 120 fps and a 360 degrees shutter angle, for the target frame rate of 40 fps at a 240 degrees shutter angle, n_frames_max=120/40=3. From equation (2), n_frames=2, thus decode_phase_idx ranges from [0, 1]. Thus, decode_phase_idx=0 indicates selecting frames with index 0 and 1, and decode_phase_idx=1 indicates selecting frames with index 1 and 2.

In this embodiment, the rendered variable frame rate intended by the content creator may be signaled as metadata, such as a supplemental enhancement information (SEI) message or as video usability information (VUI). Optionally, the rendered frame rate may be controlled by the receiver or a user. An example of frame rate conversion SEI messaging that specifies the preferred frame rate and shutter angle of the content creator is shown in Table 5. The SEI message can also indicate if combining frames is performed in the coded signal domain (e.g., gamma, PQ, etc.) or the linear light domain. Note that postprocessing requires a frame buffer in addition to the decoder picture buffer (DPB). The SEI message may indicate how many extra frame buffers are needed, or some alternative method for combining frames. For example, to reduce complexity, frames may be recombined at reduced spatial resolution.

As depicted in Table 4, at certain combinations of frame rates and shutter angles (e.g., at 30 fps and 360 degrees or at 24 fps and 288 or 360 degrees) a decoder may need to combine more than three decoded frames, which increases the number of buffer space required by the decoder. To reduce the burden of extra buffer space in the decoder, in some embodiments, certain combinations of frame rates and shutter angles may be off limits to the set of allowed decoding parameters (e.g., by setting appropriate coding Profiles and Levels).

Considering again, as an example, the case of playback at 24 fps, a decoder may decide to display the same frame five times to be displayed at 120 fps output frame rate. This is exactly the same as showing the frame a single time at 24 fps output frame rate. The advantage of keeping a constant output frame rate is that a display can run at a constant clock speed, which makes all the hardware much simpler. If the display can dynamically vary the clock speed then it may make more sense to only show the frame once (for $1/24^{th}$ of a second), instead of repeating the same frame five times (each $1/120^{th}$ of a second). The former approach may result in slightly higher picture quality, better optical efficiency, or better power efficiency. Similar considerations are also applicable to other frame rates.

Table 5 depicts an example of a frame rate conversion SEI messaging syntax according to an embodiment.

TABLE 5

Example of SEI message syntax allowing frame-rate conversion

| framerate_conversion( payloadSize ) { | Descriptor |
|---|---|
| framerate_conversion_cancel_flag | u(1) |
| if( !frame_conversion_cancel_flag ) { | |
|   base_frame_rate | u(9) |
|   base_shutter_angle | u(9) |
|   decode_phase_idx_present_flag | u(1) |
|   if ( decode_phase_idx_present_flag ) { | |
|     decode_phase_idx | u(3) |
|   } | |

TABLE 5-continued

Example of SEI message syntax allowing frame-rate conversion

| framerate_conversion( payloadSize ) { | Descriptor |
|---|---|
|     conversion_domain_idc | u(1) |
|     num_frame_buffer | u(3) |
|     framerate_conversion_persistence_flag | u(1) |
| } | |
| } | | framerate_conversion_cancel_flag equal to 1 indicates that the SEI message cancels the persistence of any previous frame rate conversion SEI message in output order. framerate_conversion_cancel_flag equal to 0 indicates that framerate conversion information follows.
base_frame_rate specifies the desired frame rate.
base_shutter_angle specifies the desired shutter angle.
decode_phase_idx_present_flag equal to 1 specifies that decoding phase information is present.
decode_phase_idx_present_flag equal to 0 specifies that decoding phase information is not present.
decode_phase_idx indicates the offset index within a set of sequential frames having index values 0..(n_frames_max-1) where n frames_max = 120/base_frame_rate. The value of decode_phase_idx shall be in the range of 0 .. (n_frames_max-n_frames), where n_frames = base_shutter_angle/(3*base_frame_rate). When decode_phase_idx is not present, it is inferred to be 0.
conversion_domain_idc equal to 0 specifies that frame combination is performed in linear domain. conversion_domain_idc equal to 1 specifies that frame combination is performed in non-linear domain.
num_frame_buffers specifies the additional number of frame buffers (not counting DPB).
framerate_conversion_persistence_flag specifies the persistence of the frame rate conversion SEI message for the current layer. framerate_conversion_persistence_flag equal to 0 specifies that the framerate conversion SEI message applies to the current decoded picture only. Let picA be the current picture. framerate_conversion_persistence_flag equal to 1 specifies that the frame rate conversion SEI message persists for the current layer in output order until one or more of the following conditions are true:
A new coded layer-wise video sequence (CLVS) of the current layer begins.
The bitstream ends.
A picture picB in the current layer in an access unit containing a framerate conversion SEI message that is applicable to the current layer is output for which PicOrderCnt( picB ) is greater than PicOrderCnt( picA ), where PicOrderCnt( picB ) and PicOrderCnt( picA ) are the PicOrderCntVal values of picB and picA, respectively, immediately after the invocation of the decoding process for picture order count for picB.

Third Embodiment—Input Encoded at Multiple Shutter Angles

A third embodiment is a coding scheme that allows the extraction of sub-frame rates from the bitstream, thus supporting backward compatibility. In HEVC, this is achieved by temporal scalability. Temporal-layer scalability is enabled by assigning different values to a temporal_id syntax element for the decoded frames. The bitstream can thereby be extracted simply on the basis of temporal_id values. However, the HEVC-style approach to temporal scalability does not enable rendering output frame rates with different shutter angles. For example, a 60 fps base frame rate extracted from an 120 fps original will always have a shutter angle of 180 degrees.

In ATSC 3.0, an alternative method is described in which frames at 60 fps having a 360 degrees shutter angles are emulated as a weighted average of two 120 fps frames. The emulated 60 fps frames are assigned temporal_id value of 0 and are combined with alternating original 120 fps frames assigned temporal_id value 1. When 60 fps is needed, the decoder only needs to decode frames with temporal_id 0. When 120 fps is needed, the decoder may subtract each temporal_id=1 frame (i.e., a 120 fps frame) from a scaled version of each corresponding temporal_id=0 frame (i.e., emulated 60 fps frame) to recover the corresponding original 120 fps frame that was not transmitted explicitly, thereby reconstituting all the original 120 fps frames.

In embodiments of this invention, a new algorithm that supports multiple target frame rates and target shutter angles in a manner that is backward compatible (BC) is described. The proposal is to preprocess the original 120 fps content at a base frame rate at several shutter angles. Then, at the decoder, other frame rates at various other shutter angles can be simply derived. The ATSC 3.0 approach can be thought of as a special case of the proposed scheme, where frames with temporal_id=0 carry frames at 60 fps@360 shutter angle and frames with temporal_id=1 carry frames at 60 fps@180 shutter angle.

Figure 4:
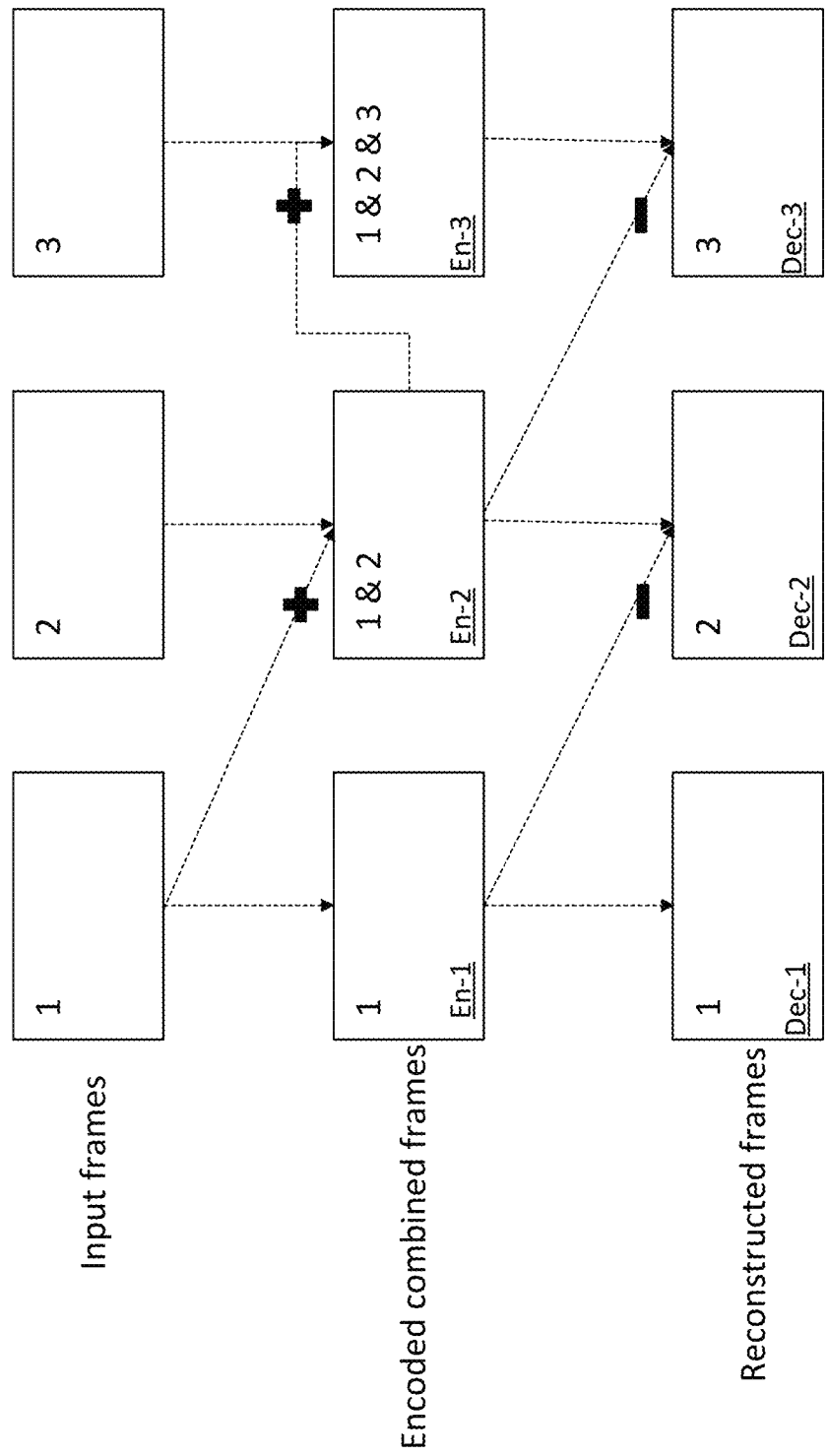
FIG. 4 depicts an example representation for temporal scalability at various frame rates and shutter angles with backwards compatibility according to an embodiment of this invention.

As a first example, as depicted in FIG. 4, consider an input sequence at 120 fps and a 360 shutter angle that is used to encode a sequence with a base layer frame rate of 40 fps and shutter angles at 120, 240, and 360 degrees. In this scheme the encoder computes new frames by combining up to three of the original input frames. For example, encoded frame 2 (En-2) representing the input at 40 fps and 240 degrees is generated by combining input frames 1 and 2, and encoded frame 3 (En-3) representing the input at 40 fps and 360 degrees is generated by combining frame En-2 to input frame 3. In the decoder, to reconstruct the input sequence, decoded frame 2 (December-2) is generated by subtracting frame En-1 from frame En-2, and decoded frame 3 (December-3) is generated by subtracting frame En-2 from frame En-3. The three decoded frames represent an output at base frame rate of 120 fps and shutter angle 360 degrees. Additional frame rates and shutter angles can be extrapolated using the decoded frames as depicted in Table 6. In Table 6, the function Cs(a,b) denotes the combination of input frames a to b, where the combining can be performed by averaging, weighted averaging, filtering, and the like.

TABLE 6

Example of frame combination with a baseline of 40 fps

| | | | | | | | | | |
|---|---|---|---|---|---|---|---|---|---|
| Input Frames 120 fps @360 | s1 | s2 | s3 | s4 | s5 | s6 | s7 | s8 | s9 |
| Encoded Frames 120 fps | e1 = s1 | e2 = Cs(1, 2) | e3 = Cs(1, 3) | e4 = s4 | e5 = Cs(4, 5) | e6 = Cs(4, 6) | e7 = s7 | e8 = Cs(7, 8) | e9 = Cs(7, 9) |
| Decode 120 fps | | | | | | | | | |
| @360 | e1 = s1 | e2 − e1 = s2 | e3 − e2 = s3 | e4 = s4 | e5 − e4 = s5 | e6 − e4 = s6 | e7 = s7 | e8 − e7 = s8 | e9 − e8 = s9 |
| Decode 60 fps | | | | | | | | | |
| @360 | | e2 | e3 − e2 + e4 = Cs(3, 4) | | e6 − e4 = Cs(5, 6) | | e8 = Cs(7, 8) | | e9 − e8 + e10 |
| @180 | | e1 | e3 − e2 = s3 | | e5 − e4 = s5 | | e7 | | e9 − e8 |

TABLE 6-continued

Example of frame combination with a baseline of 40 fps

| Input Frames 120 fps @360 | s1 | s2 | s3 | s4 | s5 | s6 | s7 | s8 | s9 |
|---|---|---|---|---|---|---|---|---|---|
| Encoded Frames 120 fps | e1 = s1 | e2 = Cs(1, 2) | e3 = Cs(1, 3) | e4 = s4 | e5 = Cs(4, 5) | e6 = Cs(4, 6) | e7 = s7 | e8 = Cs(7, 8) | e9 = Cs(7, 9) |
| Decode 40 fps | | | | | | | | | |
| @360 | | e3 = Cs(1, 3) | | | e6 | | | e9 | |
| @240 | | e2 = Cs(1, 2) | | | e5 | | | e8 | |
| @120 | | e1 = s1 | | | e4 | | | e7 | |
| Decode 30 fps | | | | | | | | | |
| @360 | | e3 + e4 = Cs(1, 4) | | | e6 − e4 + e8 = Cs(5, 8) | | | e9 − e8 + e12 | |
| @270 | | e3 = Cs(1, 3) | | | e6 − e5 + e7 = Cs(5, 7) | | | e9 − e8 + e11 | |
| @180 | | e2 = Cs(1, 2) | | | e6 − e4 = Cs(5, 6) | | | e9 − e8 + e10 | |
| @90 | | e1 | | | e5 − e4 = s5 | | | e9 − e8 | |
| Decode 24 fps | | | | | | | | | |
| @360 | | e3 + e5 = Cs(1, 5) | | | e6 − e5 + e9 + e10 = Cs(6, 10) | | | | |
| @288 | | e3 + e4 = Cs(1, 4) | | | e6 − e5 + e9 = Cs(6, 9) | | | | |
| @216 | | e3 = Cs(1, 3) | | | e6 − e5 + e8 = Cs(6, 8) | | | | |
| @144 | | e2 = Cs(1, 2) | | | e6 − e5 + e7 = Cs(6, 7) | | | | |
| @72 | | e1 = s1 | | | e6 − e5 = s6 | | | | |

An advantage of this approach is that, as depicted in Table 6, all the 40 fps versions can be decoded without any further processing. Another advantage is that other frame rates can be derived at various shutter angles. For example, consider a decoder decoding at 30 fps and a shutter angle of 360. From Table 4, the output corresponds to the sequence of frames generated by Ce(1,4)=Cs(1,4), Cs(5,8), Cs(9,12), and the like, which matches the decoding sequence depicted in Table 6 as well; however, in Table 6, Cs(5,8)=e6−e4+e8. In an embodiment, look-up tables (LUTs) can be used to define how the decoded frames need to be combined to generate an output sequence at the specified output frame rate and emulated shutter angle.

In another example, it is proposed to combine up to five frames in the encoder in order to simplify the extraction of the 24 fps base layer at shutter angles of 72, 144, 216, 288, and 360 degrees, as shown below. This is desirable for movie content that is best presented at 24 fps on legacy televisions.

TABLE 7

Example of frame combination with a baseline of 24 fps

| Input Frames 120 fps @360 | s1 | s2 | s3 | s4 | s5 | s6 | s7 | s8 | s9 |
|---|---|---|---|---|---|---|---|---|---|
| Enc. frames | e1 = s1 | e2 = Cs(1, 2) | e3 = Cs(1, 3) | e4 = Cs(1, 4) | e5 = Cs(1, 5) | e6 = s6 | e7 = Cs(6, 7) | e8 = Cs(6, 8) | e9 = Cs(6, 9) |
| Decode 120 fps | | | | | | | | | |
| @360 | e1 | e2 − e1 | e3 − e2 | e4 − e3 | e5 − e4 | e6 | e7 − e6 | e8 − e7 | e9 − e8 |
| Decode 60 fps | | | | | | | | | |
| @360 | e2 | | e4 − e2 | | e5 − e4 + e6 | | e8 − e6 | | e10 − e8 |
| @180 | e1 | | e3 − e2 | | e5 − e4 | | e7 − e6 | | e9 − e8 |
| Decode 40 fps | | | | | | | | | |
| @360 | e3 | | | | e5 − e3 + e6 | | | e9 − e6 | |
| @240 | e2 | | | | e5 − e3 | | | e8 − e6 | |
| @120 | e1 | | | | e4 − e3 | | | e7 − e6 | |

TABLE 7-continued

Example of frame combination with a baseline of 24 fps

| Input Frames 120 fps @360 | s1 | s2 | s3 | s4 | s5 | s6 | s7 | s8 | s9 |
|---|---|---|---|---|---|---|---|---|---|
| Enc. frames | e1 = s1 | e2 = Cs(1, 2) | e3 = Cs(1, 3) | e4 = Cs(1, 4) | e5 = Cs(1, 5) | e6 = s6 | e7 = Cs(6, 7) | e8 = Cs(6, 8) | e9 = Cs(6, 9) |
| Decode 30 fps | | | | | | | | | |
| @360 | | | e4 | | e5 − e4 + e8 | | | e10 − e8 + e12 | |
| @270 | | | e3 | | e5 − e4 + e7 | | | e10 − e8 + e11 | |
| @180 | | | e2 | | e5 − e4 + e6 | | | e10 − e8 | |
| @90 | | | e1 | | e5 − e4 | | | e9 − e8 | |
| Decode 24 fps | | | | | | | | | |
| @360 | | | | | e5 | | | | e10 |
| @288 | | | | | e4 | | | | e9 |
| @216 | | | | | e3 | | | | e8 |
| @144 | | | | | e2 | | | | e7 |
| @72 | | | | | e1 | | | | e6 |

As depicted in Table 7, if the decoding frame rate matches the baseline frame rate (24 fps), then, in each group of five frames (e.g., e1 to e5) a decoder can simply select the one frame at the desired shutter angle (e.g., e2 for a shutter angle at 144 degrees). To decode at a different frame rate and a specific shutter angle, the decoder will need to determine how to properly combine (say, by addition or subtraction) the decoded frames. For example, to decode at 30 fps and a shutter angle of 180 degrees, the following steps may be followed:
  a) The decoder may consider a hypothetical encoder transmitting at 120 fps and 360 degrees without any consideration for backward compatibility, then, from Table 1, the decoder needs to combine 2 out of 4 frames to generate the output sequence at the desired frame rate and shutter angle. For example, as depicted in Table 4, the sequence includes, Ce(1,2)=Avg(s1, s2), Ce(5,6)=Avg(s5, s6), and the like, where Avg(s1,s2) may denote averaging of frames s1 and s2.
  b) Given that by definition the encoded frames can be expressed as e1=s1, e2=Avg(s1, s2), e3=Avg(s1, s3), and the like, one can easily derive that the sequence of frames in step a) can also be expressed as:

$$Ce(1,2)=Avg(s1,s2)=e2$$

$$Ce(5,6)=Avg(s5,s6)=Avg(s1,s5)-Avg(s1,s4)+s6=e5-e4+e6$$

etc.

As before, the proper combination of decoded frames can be precomputed and be available as a LUT.

An advantage of the proposed method is that it provides options for both content creators and users; i.e., in enables directorial/editorial choice and user choice. For example, preprocessing content in the encoder allows for a base frame rate to be created with various shutter angles. Each shutter angle can be assigned a temporal_id value in the range [0, (n_frames−1)], where n_frames has a value equal to 120 divided by the base frame rate. (For example, for a base frame rate of 24 fps, temporal_id is in the range [0,4].) The choice may be made to optimize compression efficiency, or for aesthetic reasons. In some use cases, say, for over the top streaming, multiple bitstreams with different base layers can be encoded and stored and offered to users to select.

In a second example of the disclosed methods, multiple backward compatible frame rates may be supported. Ideally, one may want to be able to decode at 24 frames per second to get a 24 fps base layer, at 30 frames per second to get a 30 fps sequence, at 60 frames per second to get a 60 fps sequence, and the like. If a target shutter angle is not specified, a default target shutter angle, among those shutter angles permissible for the source and target frame rates, as close as possible to 180 degrees is recommended. For example, for the values depicted in Table 7, preferred target shutter angles for fps at 120, 60, 40, 30, and 24 are 360, 180, 120, 180, and 216 degrees.

From the above examples it can be observed that the choice of how to encode the content can influence the complexity of decoding specific base layer frame rates. One embodiment of this invention is to adaptively choose the encoding scheme based on the desired base layer frame rate. For movie content this may be 24 fps, for example, while for sports it may be 60 fps.

Example syntax for the BC embodiment of the current invention is shown below and in Tables 8 and 9.

In SPS (Table 8), two syntax elements are added: sps_hfr_BC_enabled_flag, and sps_base_framerate (if sps_hfr_BC_enabled_flag is set equal to 1).

sps_hfr_BC_enabled_flag equal to 1 specifies that high frame rate with backward compatibility is enabled in the coded video sequence (CVS). sps_hfr_BC_enabled_flag equal to 0 specifies that high frame rate with backward compatibility is not enabled in the CVS.

sps_base_framerate specifies the base framerate for current CVS.

In tile group header, if sps_hfr_BC_enabled_flag is set to 1, the syntax number_avg_frames is sent in the bitstream.

number_avg_frames specifies the number of frames at the highest framerate (e.g., 120 fps) that are combined to generate the current picture at base framerate.

TABLE 8

Example RBSP syntax for input at various shutter angles

| seq_parameter_set_rbsp( ) { | Descriptor |
|---|---|
|   sps_max_sub_layers_minus1 | u(3) |
|   sps_reserved_zero_5bits | u(5) |
|   profile_tier_level( sps_max_sub_layers_minus1 ) | |
|   sps_seq_parameter_set_id | ue(v) |
|   ... | |
|   sps_hfr_BC_enabled_flag | u (1) |
|   if( sps_hfr_BC_enabled_flag ) { | u (1) |
|     sps_base_frame_rate | u (9) |
|   } | |
|   ... | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

TABLE 9

Example picture parameter set RBSB syntax for input at various shutter angles

| pic_parameter_set_rbsp( ) { | Descriptor |
|---|---|
|   pps_pic_parameter_set_id | ue(v) |
|   pps_seq_parameter_set_id | ue(v) |
|   ... | |
|   if( sps_hfr_BC_enabled_flag ) | |
|     number_avg_frames | se(v) |
|   ... | |
|   rbsp_trailing_bits( ) | |
| } | |

Variations on the Second Embodiment (Fixed Frame Rate)

The HEVC (H.265) coding standard (Ref.[1]) and the under development Versatile Video Coding Standard (commonly referred to as VVC, see Ref.[2]), define a syntax element, pic_struct, that indicates whether a picture should be displayed as a frame or as one or more fields, and whether a decoded picture should be repeated. A copy of Table D.2, "Interpretation of pic_struct," from HEVC is provided for ease of reference in the Appendix.

It is important to note that, as appreciated by the inventors, the existing pic_struct syntax element can support only a specific subset of content frame rates when using a fixed frame rate coding container. For example, when using a fixed frame rate container of 60 fps, the existing pic_struct syntax, when fixed_pic_rate_within_cvs_flag is equal to 1, can support 30 fps by using frame doubling, and 24 fps by using frame doubling and frame tripling in alternating combination on every other frame. However, when using a fixed frame rate container of 120 fps, the current pic_struct syntax cannot support frame rates of 24 fps nor 30 fps. To alleviate this problem, two new methods are proposed: one is an extension of the HEVC version, and the other is not.

Method 1: Pic_Struct without Backward Compatibility

VVC is still under development, thus one can design syntax with maximal freedom. In an embodiment, in pic_struct, it is proposed to remove the options for frame doubling and frame tripling, use a specific value of pic_struct to indicate arbitrary frame repetition, and add a new syntax element, num_frame_repetition_minus2, that specifies the number of frames to repeat. An example of the proposed syntax is described in the following Tables, where Table 10 denotes changes over Table D.2.3 in HEVC and Table 11 denotes changes of Table D.2 shown in the Appendix.

TABLE 10

Example picture timing SEI message syntax, method 1

| pic_timing( payloadSize ) { | Descriptor |
|---|---|
|   if( frame_field_info_present_flag ) { | |
|     pic_struct | u(4) |
|     if( pic_struct == 7) | u(4) |
|       num_frame_repetition_minus2 | u(4) |
|     source_scan_type | u(2) |
|     duplicate_flag | u(1) |
|   } | |
| ....(as the original) | | num_frame_repetition_minus2 plus 2 indicates that when fixed_pic_rate_within_cvs_flag is equal to 1, the frame should be displayed num_frame_repetition_minus2 plus 2 times consecutively on displays with a frame refresh interval equal to DpbOutputElementalInterval[ n ] as given by Equation E-73.

TABLE 11

Example of revised of pic_struct according to method 1

| Value | Indicated display of picture | Restrictions |
|---|---|---|
| 0 | (progressive) Frame | field_seq_flag shall be equal to 0 |
| 1 | Top field | field_seq_flag shall be equal to 1 |
| 2 | Bottom field | field_seq_flag shall be equal to 1 |
| 3 | Top field, bottom field, in that order | field_seq_flag shall be equal to 0 |
| 4 | Bottom field, top field, in that order | field_seq_flag shall be equal to 0 |
| 5 | Top field, bottom field, top field repeated, in that order | field_seq_flag shall be equal to 0 |
| 6 | Bottom field, top field, bottom field repeated, in that order | field_seq_flag shall be equal to 0 |
| 7 | Frame repetition | field_seq_flag shall be equal to 0 fixed_pic_rate_within_cvs_flag shall be equal to 1 |
| 8 | Top field paired with previous bottom field in output order | field_seq_flag shall be equal to 1 |
| 9 | Bottom field paired with previous top field in output order | field_seq_flag shall be equal to 1 |
| 10 | Top field paired with next bottom field in output order | field_seq_flag shall be equal to 1 |
| 11 | Bottom field paired with next top field in output order | field_seq_flag shall be equal to 1 |

Method 2: Extended Version of HEVC Version of Pic_Struct

AVC and HEVC decoders are already deployed, thus it may be desired to simply extend the existing pic_struct syntax without removing old options. In an embodiment, a new pic_struct=13, "frame repetition extension" value, and a new syntax element, num_frame_repetition_minus4, are added. An example of the proposed syntax is described in Tables 12 and 13. For pic_struct values 0-12, the proposed syntax is identical with the one in Table D.2 (as shown in the Appendix), thus those values are omitted for simplicity.

TABLE 12

Example picture timing SEI message syntax, method 2

| pic_timing( payloadSize ) { | Descriptor |
|---|---|
|   if( frame_field_info_present_flag ) { | |
|     pic_struct | u(4) |
|     if( pic_struct == 13) | u(4) |
|       num_frame_repetition_minus4 | u(4) |

TABLE 12-continued

Example picture timing SEI message syntax, method 2

| pic_timing( payloadSize ) { | Descriptor |
|---|---|
| source_scan_type | u(2) |
| duplicate_flag | u(1) |
| } | |
| ...(as the original) | | num_frame_repetition_minus4 plus 4 indicates that when fixed_pic_rate_within_cvs_flag is equal to 1, the frame should be displayed num_frame_repetition_minus4 plus 4 times consecutively on displays with a frame refresh interval equal to DpbOutputElemental-Interval[ n ] as given by Equation E-73.

TABLE 13

Example of revised pic_struct, method 2

| Value | Indicated display of picture | Restrictions |
|---|---|---|
| 0-12 | As in Table D.2 | As in Table D.2 |
| 13 | Frame repetition extension | field_seq_flag shall be equal to 0 fixed_pic_rate_within_cvs_flag shall be equal to 1 |

In HEVC, parameter frame_field_info_present_flag is present in the video usability information (VUI), but the syntax elements pic_struct, source_scan_type, and duplicate_flag are in the pic_timing( ) SEI message. In an embodiment, it is proposed to move all related syntax elements to VUI, together with the frame_field_info_present_flag. An example of the proposed syntax is depicted in Table 14.

TABLE 14

Example VUI parameter syntax with support for the revised pic_struct syntax element

| vui_parameters( ) { | Descriptor |
|---|---|
| ... | u(1) |
| field_seq_flag | u(1) |
| frame_field_info_present_flag | u(1) |
| if( frame_field_info_present_flag ) { | |
| pic_struct | u(4) |
| source_scan_type | u(2) |
| duplicate_flag | u(1) |
| } | |
| ... | |
| } | |

Alternative Signaling of Shutter Angle Information

When dealing with variable frame rate, it is desirable to identify both the desired frame rate and the desired shutter angle. In prior video coding standards, "Video Usability Information" (VUI) provides essential information for the proper display of video content, such as the aspect ratio, colour primaries, chroma sub-sampling, etc. VUI may also provide frame rate information if fixed pic rate is set to 1; however, there is no support for shutter angle information. Embodiments allow for different shutter angles to be used for different temporal layers, and a decoder can use shutter angle information to improve the final look on the display.

For example, HEVC supports temporal sub layers that essentially use frame dropping techniques to go from a higher frame rate to lower frame rate. The major problem with this is that the effective shutter angle is reduced with each frame drop. As an example, 60 fps can be derived from a 120 fps video by dropping every other frame; 30 fps can be derived by dropping 3 out of 4 frames; and 24 fps can be derived by dropping 4 out of 5 frames. Assuming a full 360 degrees shutter for 120 Hz, with simple frame dropping, the shutter angles for 60 fps, 30 fps, and 24 fps are 180, 90, and 72 degrees, respectively [3]. Experience has shown that shutter angles below 180 degrees are generally unacceptable, especially with frame rates below 50 Hz. By providing shutter angle information, for example, if it is desired that a display produces a cinematic effect from a 120 Hz video with reduced shutter angle for each temporal layer, smart techniques may be applied to improve the final look.

In another example, one may want to support a different temporal layer (say, a 60 fps sub-bitstream inside a 120 fps bitstream) with the same shutter angle. Then, the major problem is that when 120 fps video is displayed at 120 Hz, the even/odd frames have different effective shutter angle. If a display has the related information, smart techniques can be applied to improve the final look. An example of the proposed syntax is shown in Table 15, where the E.2.1 VUI parameters syntax Table in HEVC (Ref. [1]) is modified to support shutter angle information as noted. Note that in another embodiment, instead of expressing shutter_angle syntax in absolute degrees, it can alternatively be expressed as ratio of frame rate over shutter speed (see equation (1)).

TABLE 15

Example VUI parameter syntax with shutter angle support

| vui_parameters( ) { | Descriptor |
|---|---|
| ... | |
| vui_timing_info_present_flag | u(1) |
| if( vui_timing_info_present_flag ) { | |
| vui_num_units_in_tick | u(32) |
| vui_time_scale | u(32) |
| vui_poc_proportional_to_timing_flag | u(1) |
| if( vui_poc_proportional_to_timing_flag ) | |
| vui_num_ticks_poc_diff_one_minus1 | ue(v) |
| vui_hrd_parameters_present_flag | u(1) |
| if( vui_hrd_parameters_present_flag ) | |
| hrd_parameters( 1, sps_max_sub_layers_minus1 ) | |
| } | |
| vui_shutter_angle_info_present_flag | u(1) |
| if( vui_shutter_angles_info_present_flag ) { | |
| fixed_shutter_angle_within_cvs_flag | u(1) |
| if (fixed_shutter_angle_with_cvs_flag ) | |
| fixed_shutter_angle | u(9) |
| else { | |
| for( i = 0; i <= sps_max_sub_layers_minus1; i++ ) { | |
| sub_layer_shutter_angle[ i ] | u(9) |
| } | |
| } | |
| } | |
| ... | |
| } | | vui_shutter_angle_info_present_flag equal to 1 specifies that shutter angle information is present in the vui_parameters( ) syntax structure. vui_shutter_angle_info_present_flag equal to 0 specifies that shutter angle information is not present in the vui_parameters( ) syntax structure.
fixed_shutter_angle_within_cvs_flag equal to 1 specifies that shutter angle information is the same for all temporal sub-layers in the CVS. fixed_shutter_angle_within_cvs_flag equal to 0 specifies that shutter angle information may not be the same for all temporal sub-layers in the CVS.
fixed_shutter_angle specifies the shutter angle in degrees within a CVS. The value of fixed_shutter_angle shall be in the range of 0 to 360.
sub_layer_shutter_angle[ i ] specifies the shutter angle in degrees when HighestTid is equal to i. The value of sub_layer_shutter_angle[ i ] shall be in the range of 0 to 360.

Gradual Frame-Rate Update within a Coded Video Sequence (CVS)

Experiments have shown that for HDR content displayed on an HDR display, to perceive the same motion juddering as standard dynamic range (SDR) playback in a 100 nits display, the frame rate needs to be increased based on the brightness of the content. In most standards (AVC, HEVC, VVC, etc.), the video frame rate can be indicated in the VUI (contained in SPS) using the vui_time_scale, vui_num_u-nits_in_tick and elemental_duration_in_tc_minus1[temporal_id_max] syntax elements, for example, as shown in Table 16 below (see Section E.2.1 in Ref.[1]).

TABLE 16

VUI syntax elements to indicate frame rate in HEVC

| vui_parameters( ) { | Descriptor |
|---|---|
| ... | |
| vui_timing_info_present_flag | u(1) |
| if( vui_timing_info_present_flag ) { | |
| vui_num_units_in_tick | u(32) |
| vui_time_scale | u(32) |
| vui_poc_proportional_to_timing_flag | u(1) |
| if( vui_poc_proportional_to_timing_flag ) | |
| vui_num_ticks_poc_diff_one_minus1 | ue(v) |
| vui_hrd_parameters_present_flag | u(1) |
| if( vui_hrd_parameters_present_flag ) | |
| hrd_parameters( 1, sps_max_sub_layers_minus1 ) | |
| } | |
| .... | |

As discussed in Ref. [1], The variable ClockTick is derived as follows and is called a clock tick: ClockTick = vui_num_units_in_tick ÷ vui_time_scale picture_duration = ClockTick * ( elemental_duration_in_tc_minus1[ i ] + 1 ) frame_rate = 1/pic_duration.

However, the frame rate can only be changed at specific time instants, for example, in HEVC, only at intra random access point (IRAP) frames or at the start of a new CVS. For HDR playback, when there is a fade-in or fade-out case, because the brightness of a picture is changing frame by frame, there might be a need to change frame rate or picture duration for every picture. To allow frame rate or picture duration refresh at any time instant (even on a frame-by-frame basis), in an embodiment, a new SEI message for "gradual refresh rate" is proposed, as shown in Table 17.

TABLE 17

Example syntax to support gradual refresh frame rate in SEI messaging

| gradual_refresh_rate( payloadSize ) { | Descriptor |
|---|---|
| num_units_in_tick | u(32) |
| time_scale | u(32) |
| } | |

The definition of new syntax num_units_in_tick is the same as vui_num_units_in_tick, and the definition of time_scale is the same as that of vui_time_scale.
num_units_in_tick is the number of time units of a clock operating at the frequency time_scale Hz that corresponds to one increment (called a clock tick) of a clock tick counter. num_units_in_tick shall be greater than 0. A clock tick, in units of seconds, is equal to the quotient of num_units_in_tick divided by time_scale. For example, when the picture rate of a video signal is 25 Hz, time_scale may be equal to 27 000 000 and num_units_in_tick may be equal to 1 080 000 and consequently a clock tick may be equal to 0.04 seconds.
time_scale is the number of time units that pass in one second. For example, a time coordinate system that measures time using a 27 MHz clock has a time_scale of 27 000 000. The value of time_scale shall be greater than 0.
The picture duration time for the picture which uses gradual_refresh_rate SEI message is defined as:

picture_duration=num_units_in_tick÷time_scale.

Signalling of Shutter Angle Information Via SEI Messaging

As discussed earlier, Table 15 provides an example of VUI parameter syntax with shutter angle support. As an example, and without limitation, Table 18 lists identical syntax elements, but now as part of an SEI message for shutter angle information. Note that SEI messaging is being used only as an example and similar messaging may be constructed at other layers of high-level syntax, such as the Sequence Parameter Set (SPS), the Picture Parameter Set (PPS), the Slice or Tile Group header, and the like.

TABLE 18

Example SEI message syntax for shutter angle information

| shutter_angle_information ( payloadSize ) { | Descriptor |
|---|---|
| fixed_shutter_angle_within_cvs_flag | u(1) |
| if (fixed_shutter_angle_within_cvs_flag) | |
| fixed_shutter_angle | u(9) |
| else { | |
| for( i = 0; i <= sps_max_sub_layers_minus1; i++ ) | |
| sub_layer_shutter_angle[ i ] | u(9) |
| } | |
| } | |

Shutter angle is typically expressed in degrees from 0 to 360 degrees. For example, a shutter angle of 180 degrees indicates that the exposure duration is ½ the frame duration. Shutter angle may be expressed as: shutter_angle=frame_rate*360*shutter_speed, where shutter_speed is the exposure duration and frame_rate is the inverse of frame duration. frame_rate for the given temporal sub-layer Tid may be indicated by the num_units_in_tick, time_scale, elemental_duration_in_tc_minus1[Tid]. For example, when fixed_pic_rate_within_cvs_flag[Tid] is equal to 1:

frame_rate=time_scale/(num_units_in_tick*(elemental_duration_in_*tc*_minus1[*Tid*]+1)).

In some embodiments, the value of shutter angle (e.g., fixed_shutter_angle) may not be an integer, for example, it may be 135.75 degrees. To allow more precision, in Table 21, one may replace u(9) (unsigned 9-bits) with u(16) or some other suitable bit-depth (e.g., 12 bits, 14 bits, or more than 16 bits).

In some embodiments, it may be beneficial to express shutter angle information in terms of "Clock ticks." In VVC, the variable ClockTick is derived as follows:

$$ClockTick = num\_units\_in\_tick \div time\_scale \quad (8)$$

Then, one can express both frame duration and exposure duration as multiple or fractional of clock ticks:

$$exposure\_duration = fN * ClockTick, \quad (9)$$

$$frame\_duration = fM * ClockTick, \quad (10)$$

where fN and fM are floating-point values and fN≤fM. Then $$\begin{aligned} shutter\_angle &= frame\_rate * 360 * shutter\_speed = \\ &\quad (1/frame\_duration) * 360 * exposure\_duration = \\ &\quad (exposure\_duration * 360) frame\_duration = \\ &\quad (fN * ClockTick * 360)/(fM * ClockTick) = \\ &\quad (fN/fM) * 360 = (Numerator/Denominator) * 360, \end{aligned} \quad (11)$$

where Numerator and Denominator are integers approximating the fN/fM ratio.

Table 19 shows an example of SEI messaging indicated by equation (11). In this example, shutter angle must be larger than 0 for a real-world camera.

TABLE 19

Example SEI messaging for shutter angle information based on clock ticks

| shutter_angle_information ( payloadSize ) { | Descriptor |
|---|---|
| fixed_shutter_angle_within_cvs_flag | u(1) |
| if (fixed_shutter_angle_within_cvs_flag) { | |
|     fixed_shutter_angle_numer_minus1 | u(16) |
|     fixed_shutter_angle_denom_minus1 | u(16) |
| } | |
| else { | |
|     for( i = 0; i <= sps_max_sub_layers_minus1; i++ ) { | |
|         sub_layer_shutter_angle_numer_minus1[ i ] | u(16) |
|         sub_layer_shutter_angle_denom_minus1[ i ] | u(16) |
|     } | |
| } | |

As discussed earlier, the use of u(16) (unsigned 16 bits) for shutter angle precision is depicted as an example and corresponds to a precision of: $360/2^{16}=0.0055$. The precision can be adjusted based on real applications. For example, using u(8), the precision is $360/2^8=1.4063$.

NOTE—Shutter angle is expressed in degrees greater than 0 but less than or equal to 360 degrees. For example, a shutter angle of 180 degrees indicates that the exposure duration is ½ the frame duration.

fixed_shutter_angle_within_cvs_flag equal to 1 specifies that shutter angle value is the same for all temporal sub-layers in the CVS. fixed_shutter_angle_within_cvs_flag equal to 0 specifies that shutter angle value may not be the same for all temporal sub-layers in the CVS.

fixed_shutter_angle_numer_minus1 plus 1 specifies the numerator used to derive shutter angle value. The value of fixed_shutter_angle_numer_minus1 shall be in the range of 0 to 65535, inclusive.

fixed_shutter_angle_demom_minus1 plus 1 specifies the denominator used to derive shutter angle value. The value of fixed_shutter_angle_demom_minus1 shall be in the range of 0 to 65535, inclusive.

The value of fixed_shutter_angle_numer_minus1 shall be less than or equal to the value of fixed_shutter_angle_demom_minus1.

The variable shutterAngle in degree is derived as follows:

$$\text{shutterAngle}=360*(\text{fixed\_shutter\_angle\_numer\_minus1}+1) \div (\text{fixed\_shutter\_angle\_demom\_minus1}+1))$$

sub_layer_shutter_angle_numer_minus1[i] plus 1 specifies the numerator used to derive shutter angle value when HighestTid is equal to i. The value of sub_layer_shutter_angle_numer_minus1[i] shall be in the range of 0 to 65535, inclusive.

sub_layer_shutter_angle_demom_minus1[i] plus 1 specifies the denominator used to derive shutter angle value when HighestTid is equal to i. The value of sub_layer_shutter_angle_demom_minus1[i] shall be in the range of 0 to 65535, inclusive.

The value of sub_layer_shutter_angle_numer_minus1[i] shall be less than or equal to the value of sub_layer_shutter_angle_denom_minus1[i].

The variable subLayerShutterAngle[i] in degree is derived as follows:

$$\text{subLayerShutterAngle}[i]=360*(\text{sub\_layer\_shutter\_angle\_numer\_minus1}[i]+1) \div (\text{sub\_layer\_shutter\_angle\_demom\_minus1}[i]+1)$$

In another embodiment, frame duration (e.g., frame_duration) may be specified by some other means. For example, in DVB/ATSC, when fixed_pic_rate_within_cvs_flag[Tid] is equal to 1:

$$\text{frame\_rate}=\text{time\_scale}/(\text{num\_units\_in\_tick}*(\text{elemental\_duration\_in\_tc\_minus1}[Tid]+1)),$$

$$\text{frame\_duration}=1/\text{frame\_rate}.$$

The syntax in Table 19 and in some of the subsequent Tables assumes that the shutter angle will always be greater than zero; however, shutter angle=0 can be used to signal a creative intent where the content should be displayed without any motion blur. Such could be the case for moving graphics, animation, CGI textures and mat screens, etc. As such, for example, signalling shutter angle=0 could be useful for mode decision in a transcoder (e.g., to select transcoding modes that preserve edges) as well as in a display that receives the shutter angle metadata over a CTA interface or 3GPP interface. For example, shutter angle=0 could be used to indicate to a display that is should not perform any motion processing such as denoising, frame interpolation, and the like. In such an embodiment, syntax elements fixed_shutter_angle_numer_minus1 and sub_layer_shutter_angle_numer_minus1[i] may be replaced by the syntax elements fixed_shutter_angle_numer and sub_layer_shutter_angle_numer[i], where fixed_shutter_angle_numer specifies the numerator used to derive shutter angle value. The value of fixed_shutter_angle_numer shall be in the range of 0 to 65535, inclusive.

sub_layer_shutter_angle_numer[i] specifies the numerator used to derive shutter angle value when HighestTid is equal to i. The value of sub_layer_shutter_angle_numer[i] shall be in the range of 0 to 65535, inclusive.

In another embodiment, fixed_shutter_angle_denom_minus1 and sub_layer_shutter_angle_denom_minus1[i] can also be replaced by the syntax elements fixed_shutter_angle_denom and sub_layer_shutter_angle_denom[i] as well.

In an embodiment, as depicted in Table 20, one can reuse the num_units_in_tick and time_scale syntax defined in SPS by setting general_hrd_parameters_present_flag equal to 1 in VVC. Under this scenario, the SEI message can be renamed as Exposure Duration SEI message.

TABLE 20

Example SEI messaging for signaling exposure duration

| exposure_duration_information ( payloadSize ) { | Descriptor |
|---|---|
| fixed_exposure_duration_within_cvs_flag | u(1) |
| if (fixed_shutter_angle_within_cvs_flag) { | |
|     fixed_exposure_duration_numer_minus1 | u(16) |
|     fixed_exposure_duration_denom_minus1 | u(16) |
| } | |
| else { | |
|     for( i = 0; i <= sps_max_sub_layers_minus1; i++ ) { | |
|         sub_layer_exposure_duration_numer_minus1[ i ] | u(16) |
|         sub_layer_exposure_duration_denom_minus1[ i ] | u(16) |
|     } | |
| } | | fixed_exposure_duration_within_cvs_flag equal to 1 specifies that effective exposure duration value is the same for all temporal sub-layers in the CVS.
fixed_exposure_duration_within_cvs_flag equal to 0 specifies that effective exposure duration value may not be the same for all temporal sub-layers in the CVS.
fixed_exposure_duration_numer_minus1 plus 1 specifies the numerator used to derive exposure duration value. The value of fixed_exposure_duration_numer_minus1 shall be in the range of 0 to 65535, inclusive.
fixed_exposure_duration_demom_minus1 plus 1 specifies the denominator used to derive exposure duration value. The value of fixed_exposure_duration_demom_minus1 shall be in the range of 0 to 65535, inclusive.
The value of fixed_exposure_during_numer_minus1 shall be less than or equal to the value of fixed_exposure_duration_demom_minus1.
The variable fixedExposureDuration is derived as follows: fixedExposureDuration = ( fixed_exposure_duration_numer_minus1 + 1 ) ÷ ( fixed_exposure_duration_demom_minus1 + 1) * ClockTicks sub_layer_exposure_duration_numer_minus1[ i ] plus 1 specifies the numerator used to derive exposure duration value when HighestTid is equal to i. The value of sub_layer_exposure_duration_numer_minus1[ i ] shall be in the range of 0 to 65535, inclusive. sub_layer_exposure_duration_demom_minus1[ i ] plus 1 specifies the denominator used to derive exposure duration value when HighestTid is equal to i. The value of sub_layer_exposure_duration_demom_minus1[ i ] shall be in the range of 0 to 65535, inclusive. The value of sub_layer_exposure_duration_numer_minus1[ i ] shall be less than or equal to the value of sub_layer_exposure_duration_demom_minus1[ i ].
The variable subLayerExposureDuration[ i ] for HigestTid equal to i is derived as follows: subLayerExposureDuration[ i ] = ( sub_layer_exposure_duration_numer_minus1[ i ] + 1 ) ÷ ( sub_layer_exposure_duration_demom_minus1[ i ] +1)* ClockTicks.

In another embodiment, as shown in Table 21, one may explicitly define clockTick by the syntax elements expo_num_units_in_tick and expo_time_scale. The advantage here is that it does not rely on whether general_hrd_parameters_present_flag set equal to 1 in VVC as the previous embodiment, then $$clockTick = expo\_num\_units\_in\_tick \div expo\_time\_scale. \quad (12)$$

TABLE 21

Example SEI messaging for exposure time signaling

| exposure_duration_information ( payloadSize ) { | Descriptor |
|---|---|
| expo_num_units_in_tick | u(32) |
| expo_time_scale | u(32) |
| fixed_exposure_duration_within_cvs_flag | u(1) |

TABLE 21-continued

Example SEI messaging for exposure time signaling

| exposure_duration_information ( payloadSize ) { | Descriptor |
|---|---|
| if (!fixed_exposure_duration_within_cvs_flag) | |
|     for( i = 0; i <= sps_max_sub_layers_minus1; i++ ) { | |
|         sub_layer_exposure_duration_numer_minus1[ i ] | u(16) |
|         sub_layer_exposure_duration_denom_minus1[ i ] | u(16) |
|     } | |
| } | | expo_num_units_in_tick is the number of time units of a clock operating at the frequency time_scale Hz that corresponds to one increment (called a clock tick) of a clock tick counter.
expo_num_units_in_tick shall be greater than 0. A clock tick, defined by variable clockTick, in units of seconds, is equal to the quotient of expo_num_units_in_tick divided by expo_time_scale.
expo_time_scale is the number of time units that pass in one second.
clockTick = expo_num_units_in_tick ÷ expo_time_scale.
NOTE:
The two syntax elements: expo_num_units_in_tick and expo_time_scale are defined to measure exposure duration.
It is a requirement for bitstream conformance that clockTick shall be less than or equal to ClockTick when num_units_in_tick and time_scale are present.
fixed_exposure_duration_within_cvs_flag equal to 1 specifies that effective exposure duration value is the same for all temporal sub-layers in the CVS.
fixed_exposure_duration_within_cvs_flag equal to 0 specifies that effective exposure duratiton value may not be the same for all temporal sub-layers in the CVS. When fixed_exposure_duration_within_cvs_flag equal to 1, the variable fixedExposureDuration is set equal to clockTick.
sub_layer_exposure_duration_numer_minus1[ i ] plus 1 specifies the numerator used to derive exposure duration value when HighestTid is equal to i. The value of sub_layer_exposure_duration_numer_minus1[ i ] shall be in the range of 0 to 65535, inclusive.
sub_layer_exposure_duration_demom_minus1[ i ] plus 1 specifies the denominator used to derive exposure duration value when HighestTid is equal to i. The value of sub_layer_exposure_duration_demom_minus1[ i ] shall be in the range of 0 to 65535, inclusive.
The value of sub_layer_exposure_duration_numer_minus1[ i ] shall be less than or equal to the value of sub_layer_exposure_duration_demom_minus1[ i ].
The variable subLayerExposureDuration[ i ] for HigestTid equal to i is deruved as follows: subLayerExposureDuration[ i ] ÷ ( sub_layer_exposure_duration_numer_minus1[ i ] + 1 ) ÷ ( sub_layer_exposure_duration_denom_minus1[ i ] + 1) * clockTick.

As discussed earlier, syntax parameters sub_layer_exposure_duration_numer_minus1[i] and sub_layer_exposure_duration_denom_minus1[i] may also be replaced by sub_layer_exposure_duration_numer[i] and sub_layer_exposure_duration_denom[i].

In another embodiment, as shown in Table 22, one may define the parameter ShutterInterval (i.e., exposure duration) by the syntax elements sii_num_units_in_shutter_interval and sii_time_scale, where $$ShutterInterval = sii\_num\_units\_in\_shutter\_interval \div sii\_time\_scale \quad (13)$$

TABLE 22

Example SEI messaging for exposure duration (shutter interval information) signaling

| shutter_interval_information ( payloadSize ) { | Descriptor |
|---|---|
| sii_num_units_in_shutter_interval | u(32) |
| sii_time_scale | u(32) |
| fixed_shutter_interval_within_cvs_flag | u(1) |
| if ( !fixed_shutter_interval_within_cvs_flag ) | |
|     for( i = 0; i <= sps_max_sub_layers_minus1; i++ ) { | |
|         sub_layer_shutter_interval_numer[ i ] | u(16) |
|         sub_layer_shutter_interval_denom[ i ] | u(16) |
|     } | |
| } | |

Shutter Interval Information SEI Message Semantics
The shutter interval information SEI message indicates the shutter interval for the associated video content prior to encoding and display—e.g., for camera-captured content, the amount of time that an image sensor was exposed to produce a picture.
sii_num_units_in_shutter_interval specifies the number of time units of a clock operating at the frequency sii_time_scale Hz that corresponds to one increment of an shutter clock tick counter. Shutter interval, defined by variable ShutterInterval, in units of seconds, is equal to the quotient of sii_num_units_in_shutter_interval divided by sii_time_scale. For example, when ShutterInterval is equal to 0.04 seconds, sii_time_scale may be equal to 27 000 000 and sii_num_units_in_shutter_interval may be equal to 1 080 000.

sii_time_scale specifies the number of time units that pass in one second. For example, a time coordinate system that measures time using a 27 MHz clock has a sii_time_scale of 27 000 000. When the value of sii_time_scale is greater than 0, the value of ShutterInterval is specified by:

ShutterInterval=*sii*_num_units_in_shutter_interval÷*sii*_time_scale

Otherwise (the value of sii_time_scale is equal to 0), ShutterInterval should be interpreted as unknown or unspecified.
NOTE 1—A value of ShutterInterval equal to 0 may indicate that the associated video content contains screen capture content, computer generated content, or other non-camera-capture content.
NOTE 2—A value of ShutterInterval greater than the value of the inverse of the coded picture rate, the coded picture interval, may indicate that the coded picture rate is greater than the picture rate at which the associated video content was created—e.g., when the coded picture rate is 120 Hz and the picture rate of the associated video content prior to encoding and display is 60 Hz. The coded interval for the given temporal sub-layer Tid may be indicated by ClockTick and elemental_duration_in_tc_minus1[Tid]. For example, when fixed_pic_rate_within_cvs_flag[Tid] is equal to 1, picture interval for the given temporal sub-layer Tid, defined by variable PictureInterval[Tid], may be specified by:

PictureInterval[*Tid*]=ClockTick*(elemental_duration_in_*tc*_minus1[*Tid*]+1).

fixed_shutter_interval_within_cvs_flag equal to 1 specifies that the value of ShutterInterval is the same for all temporal sub-layers in the CVS. fixed_shutter_interval_within_cvs_flag equal to 0 specifies that value of ShutterInterval may not be the same for all temporal sub-layers in the CVS.
sub_layer_shutter interval_numer[i] specifies the numerator used to derive sub layer shutter interval, defined by variable subLayerShutterInterval[i], in units of seconds, when HighestTid is equal to i.
sub_layer_shutter interval_denom[i] specifies the denominator used to derive sub layer shutter interval, defined by variable subLayerShutterInterval[i], in units of seconds, when HighestTid is equal to i.
The value of subLayerShutterInterval[i] for HighestTid equal to i is derived as follows. When the value of fixed_shutter_interval_within_cvs_flag is equal to 0 and the value of sub_layer_shutter interval_denom[i] is greater than 0:

subLayerShutterInterval[*i*]=ShutterInterval*sub_layer_shutter_interval_numer[*i*]÷sub_layer_shutter_interval_denom[*i*]

Otherwise (the value of sub_layer_shutter_interval_denom [i] is equal to 0), subLayerShutterInterval[i] should be interpreted as unknown or unspecified. When the value of fixed_shutter_interval_within_cvs_flag is not equal to 0, subLayerShutterInterval[*i*]=ShutterInterval.

In an alternative embodiment, instead of using a numerator and a denominator for signaling the sub-layer shutter interval, one uses a single value. An example of such syntax is shown in Table 23.

TABLE 23

Example SEI messaging for shutter interval signaling

| shutter_interval_information ( payloadSize ) { | Descriptor |
|---|---|
| sii_num_units_in_shutter_interval | u(32) |
| sii_time_scale | u(32) |
| fixed_shutter_interval_within_cvs_flag | u(1) |
| if ( !fixed_shutter_interval_within_cvs_flag ) | |
|   for( i = 0; i <= sps_max_sub_layers_minus1; i++ ) { | |
|     sub_layer_num_units_in_shutter_interval[ i ] | u(32) |
|   } | |
| } | |

Shutter Interval Information SEI Message Semantics

The shutter interval information SEI message indicates the shutter interval for the associated video content prior to encoding and display—e.g., for camera-captured content, the amount of time that an image sensor was exposed to produce a picture.

sii_num_units_in_shutter specifies the number of time units of a clock operating at the frequency sii_time_scale Hz that corresponds to one increment of an shutter clock tick counter. Shutter interval, defined by variable ShutterInterval, in units of seconds, is equal to the quotient of sii_num_units_in_shutter_interval divided by sii_time_scale. For example, when ShutterInterval is equal to 0.04 seconds, sii_time_scale may be equal to 27 000 000 and sii_num_units_in_shutter_interval may be equal to 1 080 000.

sii_time_scale specifies the number of time units that pass in one second. For example, a time coordinate system that measures time using a 27 MHz clock has a sii_time_scale of 27 000 000. When the value of sii_time_scale is greater than 0, the value of ShutterInterval is specified by:

ShutterInterval=*sii*_num_units_in_shutter_interval÷*sii*_time_scale

Otherwise (the value of sii_time_scale is equal to 0), ShutterInterval should be interpreted as unknown or unspecified.
NOTE 1—A value of ShutterInterval equal to 0 may indicate that the associated video content contain screen capture content, computer generated content, or other non-camera-capture content.
NOTE 2—A value of ShutterInterval greater than the value of the inverse of the coded picture rate, the coded picture interval, may indicate that the coded picture rate is greater than the picture rate at which the associated video content was created—e.g., when the coded picture rate is 120 Hz and the picture rate of the associated video content prior to encoding and display is 60 Hz. The coded picture interval for the given temporal sub-layer Tid may be indicated by ClockTick and elemental_duration_in_tc_minus1[Tid]. For example, when fixed_pic_rate_within_cvs_flag[Tid] is equal to 1, picture interval for the given temporal sub-layer Tid, defined by variable PictureInterval[Tid], may be specified by:

PictureInterval[*Tid*]=ClockTick*(elemental_duration_in_*tc*_minus1[*Tid*]+1).

fixed_shutter_interval_within_cvs_flag equal to 1 specifies that the value of ShutterInterval is the same for all temporal sub-layers in the CVS. fixed_shutter_interval_within_cvs_flag equal to 0 specifies that value of ShutterInterval may not be the same for all temporal sub-layers in the CVS.
sub_layer_num_units_in_shutter_interval[i] specifies the number of time units of a clock operating at the frequency sii_time_scale Hz that corresponds to one increment of an shutter clock tick counter. Sub layer shutter interval, defined by variable subLayerShutterInterval[i], in units of seconds, when HighestTid is equal to i, is equal to the quotient of sub_layer_num_units_in_shutter_interval[i] divided by sii_time_scale.

When the value of fixed_shutter_interval_within_cvs_flag is equal to 0 and the value of sii_time_scale is greater than 0, the value of subLayerShutterInterval[i] is specified by:

subLayerShutterInterval[$i$]=sub_layer_num_units_in_shutter_interval[$i$]÷sii_time_scale Otherwise (the value of sii_time_scale is equal to 0), subLayerShutterInterval[i] should be interpreted as unknown or unspecified. When the value of fixed_shutter_interval_within_cvs_flag is not equal to 0, subLayerShutterInterval[$i$]=ShutterInterval.

Table 24 provides a summary of the six approaches discussed in Tables 18-23 for providing SEI messaging related to shutter angle or exposure duration.

TABLE 24

Summary of SEI messaging approaches for signaling signal shutter angle information

| Table No. | Key signaling elements and dependencies |
|---|---|
| 18 | Shutter angle (0 to 360) is signaled explicitly |
| 19 | Shutter angle is expressed as a ratio of Numerator and Denominator values to be scaled by 360 (the clock-tick value is implied) |
| 20 | Exposure duration is signaled as a ratio of Numerator and Denominator values (the clock-tick value is implied) |
| 21 | Exposure duration is signaled as a ratio of Numerator and Denominator values; the clock tick-value is signaled explicitly as a ratio of two values |
| 22 | Shutter interval information is signaled as the ratio of two values: the number of clock-tick units in the exposure and an exposure-time scale; Sub-layer-related exposure times are signaled as a ratio of two values |
| 23 | Shutter interval information or exposure duration is signaled as the ratio of two values: the number of clock-tick units in the exposure and an exposure-time scale; Sub-layer-related exposure times are signaled as the number of clock-tick units in the exposure in each sub-layer |

Variable Frame Rate Signalling

As discussed in U.S. Provisional Application 62/883,195, filed on Aug. 6, 2019, in many applications it is desired for a decoder to support playback at variable frame rates. Frame rate adaptation is typically part of the operations in the hypothetical reference decoder (HRD), as described, for example, in Annex C of Ref. [2]. In an embodiment, it is proposed to signal via SEI messaging or other means a syntax element defining picture presentation time (PPT) as function of a 90 kHz clock. This is kind of repetition of the nominal decoder picture buffer (DPB) output time as specified in the HRD, but now using a 90 kHz ClockTicks precision as specified in the MPEG-2 system. The benefit of this SEI message are a) if HRD is not enabled, one can still use the PPT SEI message to indicate timing for each frame; b) it can ease the translation of bitstream timing and system timing.

Table 25 describes an example of the syntax of the proposed PPT timing message, which matches the syntax of the presentation time stamp (PTS) variable being used in MPEG-2 transport (H.222) (Ref.[4]).

TABLE 25

Example syntax for picture presentation time messaging

| picture_presentation_time ( payloadSize ) { | Descriptor |
|---|---|
| PPT | u(33) |
| } | |

PPT (Picture Presentation Time)
  Presentation times shall be related to decoding times as follows: The PPT is a 33-bit number coded in three separate fields. It indicates the time of presentation, $tp_n(k)$, in the system target decoder of a presentation unit k of elementary stream n. The value of PPT is specified in units of the period of the system clock frequency divided by 300 (yielding 90 kHz). The picture presentation time is derived from the PPT according to equation below.

$$PPT(k) = ((system\_clock\_frequency \times tp_n(k))/300)\%2^{33}$$

where $tp_n(k)$ is the presentation time of presentation unit $P_n(k)$.

Shutter Interval Messaging in AVC

In an embodiment, if a shutter interval information (SII) SEI message exists for any picture in a coded video sequence (CVS), then it is suggested that it must exist in the first access unit of the CVS. Unlike HEVC, a temporal index (which is used to identify a sub-layer index) does not exist in an AVC single-layer bitstream. To address this issue when the shutter interval is not fixed within a CVS, it is proposed that a shutter interval information SEI message shall be present for every picture to assign a value for sii_sub_layer_idx to each picture to identify the sub-layer index of the current picture. Other shutter interval related information shall be presented only for the first access unit of the CVS and persist until a new CVS begins or the bitstream ends.

In AVC, an access unit is defined as a set of NAL units that are consecutive in decoding order and contain exactly one primary coded picture. In addition to the primary coded picture, an access unit may also contain one or more redundant coded pictures, one auxiliary coded picture, or other NAL units not containing slices or slice data partitions of a coded picture. The decoding of an access unit always results in a decoded picture.

Example syntax element values for the case in which shutter interval is fixed for the CVS is shown in Table 26. Example syntax element values for the first and subsequent shutter interval information SEI message for the case in which shutter interval may be different for different sub-layers is shown in Table 27. In Tables 26 and 27, cells with "(none)" indicate that no value is signalled in the shutter interval information SEI message for the corresponding syntax element.

TABLE 26

Example of shutter interval information SEI message syntax element values for fixed shutter interval for IDR access unit

| syntax element | 1st shutter interval info SEI message in the CVS |
|---|---|
| sii_sub_layer_idx | 0 |
| shutter_interval_info_present_flag | 1 |
| sii_time_scale | u(32) |
| fixed_shutter_interval_within_cvs_flag | 1 |
| sii_num_units_in_shutter_interval | u(32) |

TABLE 26-continued

Example of shutter interval information SEI message syntax element values for fixed shutter interval for IDR access unit

| syntax element | 1st shutter interval info SEI message in the CVS |
|---|---|
| sii_max_sub_layers_minus1 | (none) |
| sub_layer_num_units_in_shutter_interval[ i ] | (none) |

TABLE 27

Example of shutter interval information SEI message syntax element values for non-fixed shutter interval for IDR access unit

| syntax element | 1st shutter interval info SEI message in the CVS | Subsequent shutter interval info SEI messages in the CVS | |
|---|---|---|---|
| sii_sub_layer_idx | 0 | 0 | ue(v) > 0 |
| shutter_interval_info_present_flag | 1 | 0 | (none) |
| sii_time_scale | u(32) | (none) | (none) |
| fixed_shutter_interval_within_cvs_flag | 0 | (none) | (none) |
| sii_num_units_in_shutter_interval | (none) | (none) | (none) |
| sii_max_sub_layers_minus1 | u(3) | (none) | (none) |
| sub_layer_num_units_in_shutter_interval[ i ] | u(32) | (none) | (none) |

Table 28 depicts an example syntax structure for SII SEI messaging in AVC.

TABLE 28

Example SII SEI message syntax in AVC

| shutter_interval_info( payloadSize ) { | C | Descriptor |
|---|---|---|
| sii_sub_layer_idx | 5 | ue(v) |
| if( sii_sub_layer_idx = = 0 ) | | |
|   shutter_interval_info_present_flag | 5 | u(1) |
|   if( shutter_interval_info_present_flag ) | | |
|     sii_time_scale | 5 | u(32) |
|     fixed_shutter_interval_within_cvs_flag | 5 | u(1) |
|     if( fixed_shutter_interval_within_cvs_flag ) | | |
|       sii_num_units_in_shutter_interval | 5 | u(32) |
|     else { | | |
|       sii_max_sub_layers_minus1 | 5 | u(3) |
|       for( i = 0; i <= sii_max_sub_layers_minus1; i++ ) | | |
|         sub_layer_num_units_in_shutter_interval[ i ] | 5 | u(32) |
|     } | | |
|   } | | |
| } | | |
| } | | |

The shutter interval information SEI message indicates the shutter interval for the associated video source pictures prior to encoding and display, e.g., for camera-captured content, the shutter interval is amount of time that an image sensor is exposed to produce each source picture.

sii_sub_layer_idx specifies the shutter interval temporal sub-layer index of the current picture. The value of sii_sub_layer_idx shall be equal to 0 when the current access unit is the first access unit of the CVS. When fixed_shutter_interval_within_cvs_flag is equal to 1, the value of sii_sub_layer_idx shall be equal to 0. Otherwise, fixed_shutter_interval_within_cvs_flag is equal to 0, the value of sii_sub_layer_idx shall be less than or equal to the value of sii_max_sub_layers_minus1.

shutter_interval_info_present_flag equal to 1 indicates that the syntax elements sii_time_scale, fixed_shutter_interval_within_cvs_flag, and either sii_num_units_in_shutter_interval or sii_max_sub_layers_minus1 and sub_layer_num_units_in_shutter_interval[i] are present.

shutter_interval_info_present_flag equal to 0 indicates that the syntax elements sii_time_scale, fixed_shutter_interval_within_cvs_flag, sii_num_units_in_shutter_interval, sii_max_sub_layers_minus1, and sub_layer_num_units_in_shutter_interval[i] are not present. The value of shutter_interval_info_present_flag shall be equal to 1 when the current access unit is the first access unit of the CVS. Otherwise, the current access unit is not the first access unit of the CVS, the value of shutter_interval_info_present_flag shall be equal to 0.

sii_time_scale specifies the number of time units that pass in one second. The value of sii_time_scale shall be greater than 0. For example, a time coordinate system that measures time using a 27 MHz clock has an sii_time_scale of 27 000 000.

fixed_shutter_interval_within_cvs_flag equal to 1 specifies that the indicated shutter interval is the same for all pictures in the CVS. fixed_shutter_interval_within_cvs_flag equal to 0 specifies that the indicated shutter interval may not be the same for all pictures in the CVS.

sii_num_units_in_shutter_interval, when fixed_shutter_interval_within_cvs_flag is equal to 1, specifies the number of time units of a clock operating at the frequency sii_time_scale Hz that corresponds to the indicated shutter interval of each picture in the CVS. The value 0 may be used to indicate that the associated video content contains screen capture content, computer generated content, or other non-camera-captured content.

The indicated shutter interval, denoted by the variable shutterInterval, in units of seconds, is equal to the quotient of sii_num_units_in_shutter_interval divided by sii_time_scale. For example, to represent a shutter interval equal to 0.04 seconds, sii_time_scale may be equal to 27 000 000 and sii_num_units_in_shutter_interval may be equal to 1 080 000.

sii_max_sub_layers_minus1 plus 1 specifies the maximum number of shutter interval temporal sub-layers indexes that may be present in the CVS.

sub_layer_num_units_in_shutter_interval[i], when present, specifies the number of time units of a clock operating at the frequency sii_time_scale Hz that corresponds to the shutter interval of each picture in the CVS for which the value of sii_sub_layer_idx is equal to i. The sub-layer shutter interval for each picture for which the value of sii_sub_layer_idx is equal to i, denoted by the variable subLayerShutterInterval[i], in units of seconds, is equal to the quotient of sub_layer_num_units_in_shutter_interval[i] divided by sii_time_scale.

The variable subLayerShutterInterval[i], corresponding to the indicated shutter interval of each picture in the sub-layer representation with TemporalId equal to i in the CVS, is thus derived as follows:

if(fixed_shutter_interval_within_cvs_flag)

subLayerShutterInterval[$i$]= 
        $sii$_num_units_in_shutter_interval÷$sii$_time_scale else subLayerShutterInterval[$i$]=sub_layer_num_units_in_shutter_interval[$i$]÷sii_time_scale When a shutter interval information SEI message is present for any access unit in a CVS, a shutter interval information SEI message shall be present for the IDR access unit that is the first access unit of the CVS. All shutter interval information SEI messages that apply to the same access unit shall have the same content.

sii_time_scale and fixed_shutter_interval_within_cvs_flag persist from the first access unit of the CVS until a new CVS begins or the bitstream ends.

When the value of fixed_shutter_interval_within_cvs_flag is equal to 0, a shutter interval information SEI message shall be present for every picture in the CVS. When present, sii_num_units_in_shutter_interval, sii_max_sub_layers_minus1, and sub_layer_num_units_in_shutter_interval[i], persist from the first access unit of the CVS until a new CVS begins or the bitstream ends.

REFERENCES

Each one of the references listed herein is incorporated by reference in its entirety.

[1] High efficiency video coding, H.265, Series H, Coding of moving video, ITU, (February/2018).
[2] B. Bross, J. Chen, and S. Liu, "Versatile Video Coding (Draft 5)," JVET output document, JVET-N1001, v5, uploaded May 14, 2019.
[3] C. Carbonara, J. DeFilippis, M. Korpi, "High Frame Rate Capture and Production," SMPTE 2015 Annual Technical Conference and Exhibition, Oct. 26-29, 2015.
[4] Infrastructure of audiovisual services—Transmission multiplexing and synchronization, H.222.0, Series H, Generic coding of moving pictures and associated audio information: Systems, ITU, August/2018.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to frame-rate scalability, such as those described herein. The computer and/or IC may compute any of a variety of parameters or values that relate to frame-rate scalability described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to frame-rate scalability as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to frame-rate scalability are thus described. In the foregoing specification, embodiments of the present invention have been described with reference to numerous specific details that may vary from implementation to implementation. Thus, the sole and exclusive indicator of what is the invention and what is intended by the applicants to be the invention is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX

This Appendix provides a copy of Table D.2 and associated pic_struct-related information from the H.265 specification (Ref. [1]).

TABLE D.2

Interpretation of pic_struct

| Value | Indicated display of picture | Restrictions |
|---|---|---|
| 0 | (progressive) Frame | field_seq_flag shall be equal to 0 |
| 1 | Top field | field_seq_flag shall be equal to 1 |
| 2 | Bottom field | field_seq_flag shall be equal to 1 |
| 3 | Top field, bottom field, in that order | field_seq_flag shall be equal to 0 |
| 4 | Bottom field, top field, in that order | field_seq_flag shall be equal to 0 |
| 5 | Top field, bottom field, top field repeated, in that order | field_seq_flag shall be equal to 0 |
| 6 | Bottom field, top field, bottom field repeated, in that order | field_seq_flag shall be equal to 0 |
| 7 | Frame doubling | field_seq_flag shall be equal to 0 fixed_pic_rate_within_cvs_flag shall be equal to 1 |
| 8 | Frame tripling | field_seq_flag shall be equal to 0 fixed_pic_rate_within_cvs_flag shall be equal to 1 |
| 9 | Top field paired with previous bottom field in output order | field_seq_flag shall be equal to 1 |
| 10 | Bottom field paired with previous top field in output order | field_seq_flag shall be equal to 1 |

TABLE D.2-continued

Interpretation of pic_struct

| Value | Indicated display of picture | Restrictions |
|---|---|---|
| 11 | Top field paired with next bottom field in output order | field_seq_flag shall be equal to 1 |
| 12 | Bottom field paired with next top field in output order | field_seq_flag shall be equal to 1 |

Semantics of the Pic_Struct Syntax Element pic_struct indicates whether a picture should be displayed as a frame or as one or more fields and, for the display of frames when fixed_pic_rate_within_cvs_flag is equal to 1, may indicate a frame doubling or tripling repetition period for displays that use a fixed frame refresh interval equal to DpbOutputElementalInterval[n] as given by Equation E-73. The interpretation of pic_struct is specified in Table D.2. Values of pic_struct that are not listed in Table D.2 are reserved for future use by ITU-T|ISO/IEC and shall not be present in bitstreams conforming to this version of this Specification. Decoders shall ignore reserved values of pic_struct.

When present, it is a requirement of bitstream conformance that the value of pic_struct shall be constrained such that exactly one of the following conditions is true:

The value of pic_struct is equal to 0, 7 or 8 for all pictures in the CVS.

The value of pic_struct is equal to 1, 2, 9, 10, 11 or 12 for all pictures in the CVS.

The value of pic_struct is equal to 3, 4, 5 or 6 for all pictures in the CVS.

When fixed_pic_rate_within_cvs_flag is equal to 1, frame doubling is indicated by pic_struct equal to 7, which indicates that the frame should be displayed two times consecutively on displays with a frame refresh interval equal to DpbOutputElementalInterval[n] as given by Equation E-73, and frame tripling is indicated by pic_struct equal to 8, which indicates that the frame should be displayed three times consecutively on displays with a frame refresh interval equal to DpbOutputElementalInterval[n] as given by Equation E-73.

NOTE 3—Frame doubling can be used to facilitate the display, for example, of 25 Hz progressive-scan video on a 50 Hz progressive-scan display or 30 Hz progressive-scan video on a 60 Hz progressive-scan display. Using frame doubling and frame tripling in alternating combination on every other frame can be used to facilitate the display of 24 Hz progressive-scan video on a 60 Hz progressive-scan display.

The nominal vertical and horizontal sampling locations of samples in top and bottom fields for 4:2:0, 4:2:2 and 4:4:4 chroma formats are shown in Figure D.1, Figure D.2, and Figure D.3, respectively.

Association indicators for fields (pic_struct equal to 9 through 12) provide hints to associate fields of complementary parity together as frames. The parity of a field can be top or bottom, and the parity of two fields is considered complementary when the parity of one field is top and the parity of the other field is bottom.

When frame_field_info_present_flag is equal to 1, it is a requirement of bitstream conformance that the constraints specified in the third column of Table D.2 shall apply.

NOTE 4—When frame_field_info_present_flag is equal to 0, then in many cases default values may be inferred or indicated by other means. In the absence of other indications of the intended display type of a picture, the decoder should infer the value of pic_struct as equal to 0 when frame_field_info_present_flag is equal to 0.

What is claimed is:

1. A non-transitory processor-readable medium having instructions stored thereon that, when executed by a processor, cause the processor to:

receive a coded bitstream comprising an encoded picture section including an encoding of a sequence of video pictures and a supplemental enhancement information (SEI) message including shutter interval parameters, wherein the shutter interval parameters comprise:

a shutter interval temporal sub-layer index of a current picture in the coded bitstream, wherein if the shutter interval temporal sub-layer index equals to zero, then the SEI message includes a shutter interval information present flag, wherein if the shutter interval information present flag is equal to one, then the SEI message includes:

a shutter interval time-scale parameter indicating the number of time units passing in one second;

a fixed-shutter-interval-duration flag indicating whether shutter interval duration information is fixed for all pictures in the encoded picture section; and if the fixed-shutter-interval-duration flag indicates that the shutter interval duration information is fixed, then the SEI message includes a shutter interval clock-ticks parameter indicating a number of time units of a clock operating at the frequency of the shutter interval time-scale parameter, wherein the shutter interval clock-ticks parameter divided by the shutter interval time-scale parameter indicates an exposure duration value for all the video pictures in the encoded picture section, else, the shutter interval parameters includes an array of one or more sub-layer shutter interval clock-ticks parameters indicating a number of time units of a clock at the frequency of the shutter interval time-scale parameter for one or more sub-layers in the encoded picture section, wherein, for a first sub-layer in the encoded picture section, a corresponding sub-layer shutter interval clock-ticks parameter divided by the shutter interval time-scale parameter indicates the exposure duration value for all the video pictures in the first sub-layer of the encoded picture section; and decode the sequence of video pictures based on the shutter interval parameters.

2. The non-transitory processor-readable medium of claim 1, wherein the encoded picture section comprises two or more access units, and the shutter interval temporal sub-layer index is zero for a first access unit among the two or more access units and non-zero otherwise.

3. The non-transitory processor-readable medium of claim 1, wherein the shutter interval temporal sub-layer index parameter is 0 when the fixed-shutter-interval-duration flag indicates that the shutter interval duration information is fixed.

4. The non-transitory processor-readable medium of claim 1, wherein if the fixed-shutter-interval-duration flag indicates that the shutter interval duration information is not fixed, then the SEI message includes a max sub-layers parameter to compute the maximum number of the one or more sub-layers in the encoded picture section.

5. The non-transitory processor-readable medium of claim 4, wherein if the fixed-shutter-interval-duration flag is equal to 1, then the shutter interval temporal sub-layer index shall be equal to 0, otherwise, if the fixed-shutter-interval-duration flag is equal to 0, then the value of the shutter interval temporal sub-layer index is less than or equal to the max sub-layers parameter.

6. A non-transitory processor-readable medium having instructions stored thereon that, when executed by a processor, cause the processor to:
encode input video pictures to generate an encoded bitstream;
generate a supplemental enhancement information (SEI) message indicating shutter interval information for the encoded bitstream; and
generate an output video stream that includes the encoded bitstream and the SEI message, wherein the SEI message comprises:
a shutter interval temporal sub-layer index of a current picture in the coded bitstream, wherein
if the shutter interval temporal sub-layer index equals to zero, then the SEI message includes a shutter interval information present flag, wherein if the shutter interval information present flag is equal to one, then the SEI message includes:
a shutter interval time-scale parameter indicating the number of time units passing in one second;
a fixed-shutter-interval-duration flag indicating whether shutter interval duration information is fixed for all pictures in the encoded bitstream; and
if the fixed-shutter-interval-duration flag indicates that the shutter interval duration information is fixed, then the SEI message includes
a shutter interval clock-ticks parameter indicating a number of time units of a clock operating at the frequency of the shutter interval time-scale parameter, wherein the shutter interval clock-ticks parameter divided by the shutter interval time-scale parameter indicates an exposure duration value for all the video pictures in the encoded bitstream,
else, the SEI message includes an array of one or more sub-layer shutter interval clock-ticks parameters indicating a number of time units of a clock at the frequency of the shutter interval time-scale parameter for one or more sub-layers in the encoded bitstream, wherein, for a first sub-layer in the encoded bitstream, a corresponding sub-layer shutter interval clock-ticks parameter divided by the shutter interval time-scale parameter indicates the exposure duration value for all the video pictures in the first sub-layer of the encoded bitstream.

7. The non-transitory processor-readable medium of claim 6, wherein if the fixed-shutter-interval-duration flag indicates that the shutter interval duration information is not fixed, then the SEI message includes a max sub-layers parameter to compute the maximum number of the one or more sub-layers in the encoded bitstream.

8. The non-transitory processor-readable medium of claim 7, wherein if the fixed-shutter-interval-duration flag is equal to 1, then the shutter interval temporal sub-layer index shall be equal to 0, otherwise, if the fixed-shutter-interval-duration flag is equal to 0, then the value of the shutter interval temporal sub-layer index is less than or equal to the max sub-layers parameter.

9. A non-transitory processor-readable medium having instructions stored thereon that, when executed by a processor, cause the processor to transmit an encoded bitstream, wherein generating the encoded bitstream comprises:
encoding input video pictures to generate the encoded bitstream;
generating a supplemental enhancement information (SEI) message indicating shutter interval information for the encoded bitstream; and
generating an output video stream that includes the encoded bitstream and the SEI message, wherein the SEI message comprises:
a shutter interval temporal sub-layer index of a current picture in the coded bitstream, wherein
if the shutter interval temporal sub-layer index equals to zero, then the SEI message includes a shutter interval information present flag, wherein if the shutter interval information present flag is equal to one, then the SEI message includes:
a shutter interval time-scale parameter indicating the number of time units passing in one second;
a fixed-shutter-interval-duration flag indicating whether shutter interval duration information is fixed for all pictures in the encoded bitstream; and
if the fixed-shutter-interval-duration flag indicates that the shutter interval duration information is fixed, then the SEI message includes
a shutter interval clock-ticks parameter indicating a number of time units of a clock operating at the frequency of the shutter interval time-scale parameter, wherein the shutter interval clock-ticks parameter divided by the shutter interval time-scale parameter indicates an exposure duration value for all the video pictures in the encoded bitstream,
else, the SEI message includes an array of one or more sub-layer shutter interval clock-ticks parameters indicating a number of time units of a clock at the frequency of the shutter interval time-scale parameter for one or more sub-layers in the encoded bitstream, wherein, for a first sub-layer in the encoded bitstream, a corresponding sub-layer shutter interval clock-ticks parameter divided by the shutter interval time-scale parameter indicates the exposure duration value for all the video pictures in the first sub-layer of the encoded bitstream.

10. The non-transitory processor-readable medium of claim 9, wherein if the fixed-shutter-interval-duration flag indicates that the shutter interval duration information is not fixed, then the SEI message includes a max sub-layers parameter to compute the maximum number of the one or more sub-layers in the encoded picture section.

11. The non-transitory processor-readable medium of claim 10, wherein if the fixed-shutter-interval-duration flag is equal to 1, then the shutter interval temporal sub-layer index shall be equal to 0, otherwise, if the fixed-shutter-interval-duration flag is equal to 0, then the value of the shutter interval temporal sub-layer index is less than or equal to the max sub-layers parameter.

* * * * *

UNITED STATES PATENT AND TRADEMARK OFFICE
CERTIFICATE OF CORRECTION

PATENT NO. : 11,979,589 B2  
APPLICATION NO. : 18/508088  
DATED : May 7, 2024  
INVENTOR(S) : Robin Atkins et al.

Page 1 of 1

It is certified that error appears in the above-identified patent and that said Letters Patent is hereby corrected as shown below:

On the Title Page

Page 2, Column 1, Item (63) Related U.S. Application Data, Line 8, Delete "continuation" and insert --continuation-in-part--.

Signed and Sealed this
Twenty-sixth Day of November, 2024

Katherine Kelly Vidal
*Director of the United States Patent and Trademark Office*